United States Patent
Zhang et al.

(10) Patent No.: US 10,917,905 B2
(45) Date of Patent: Feb. 9, 2021

(54) AUTONOMOUS UPLINK TRANSMISSION USING SHARED RADIO FREQUENCY SPECTRUM

(71) Applicant: QUALCOMM Incorporated, San Diego, CA (US)

(72) Inventors: Xiaoxia Zhang, San Diego, CA (US); Jing Sun, San Diego, CA (US); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 10 days.

(21) Appl. No.: 16/357,462

(22) Filed: Mar. 19, 2019

(65) Prior Publication Data
US 2019/0320452 A1    Oct. 17, 2019

Related U.S. Application Data

(60) Provisional application No. 62/658,425, filed on Apr. 16, 2018.

(51) Int. Cl.
*H04W 72/12* (2009.01)
*H04W 72/04* (2009.01)
(Continued)

(52) U.S. Cl.
CPC ... *H04W 72/1268* (2013.01); *H04W 72/0446* (2013.01); *H04W 88/02* (2013.01); *H04W 88/08* (2013.01)

(58) Field of Classification Search
None
See application file for complete search history.

(56) References Cited

U.S. PATENT DOCUMENTS

| 10,362,593 B2 * | 7/2019 | Salem ............... H04W 16/14 |
| 2018/0054753 A1 * | 2/2018 | Fujishiro ......... H04W 28/0215 |

(Continued)

FOREIGN PATENT DOCUMENTS

| WO | WO-2018058562 A1 | 4/2018 | |
| WO | WO-2018075745 A1 * | 4/2018 | ........ H04W 74/0808 |

OTHER PUBLICATIONS

Cisco Systems: "Uplink Channel Access for LAA", 3GPP Draft; R1-153844, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015, Aug. 23, 2015, XP051039349, Retrieved from the Internet: URL:http://www.3gpp.org/ftp/Meetings_3GPP_SYNC/RAN1/Docs/ [retrieved on Aug. 23, 2015], 6 pages, Chapters 1-5, Figures 1, 2.

(Continued)

*Primary Examiner* — Ayaz R Sheikh
*Assistant Examiner* — Faiyazkhan Ghafoerkhan
(74) *Attorney, Agent, or Firm* — Qualcomm Incorporated; Ke Liu

(57) ABSTRACT

Methods, systems, and devices for wireless communications, and more particularly for facilitating autonomous uplink transmission (AUL) using shared (e.g., in a synchronized manner among one or more operators) radio frequency spectrum are described. In aspects, a method of wireless communication over a shared medium may include determining, by at least one user equipment (UE) served by a base station associated with a first operator, access is obtained to the shared medium for a transmission opportunity (TXOP) by the base station based on autonomous uplink resources in the TXOP allocated to at least one UE served by the base station and/or an indication from the at least one UE of (Continued)

autonomous uplink data, and transmitting the autonomous uplink data from the at least one UE to the base station.

29 Claims, 16 Drawing Sheets

(51) Int. Cl.
   *H04W 88/08* (2009.01)
   *H04W 88/02* (2009.01)

(56) References Cited

U.S. PATENT DOCUMENTS

| | | | |
|---|---|---|---|
| 2019/0159256 A1* | 5/2019 | Talarico | H04L 1/187 |
| 2019/0306923 A1* | 10/2019 | Xiong | H04W 72/042 |
| 2019/0335501 A1* | 10/2019 | Talarico | H04W 74/0808 |
| 2020/0092861 A1* | 3/2020 | Xu | H04L 5/0044 |
| 2020/0092913 A1* | 3/2020 | Xu | H04W 72/0446 |
| 2020/0100286 A1* | 3/2020 | Xu | H04L 1/1887 |

OTHER PUBLICATIONS

International Search Report and Written Opinion—PCT/US2019/023080—ISA/EPO—dated May 23, 2019.
Qualcomm Incorporated: "Advanced Frame Structure", 3GPP Draft; R1-1610132, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 1, 2016, XP051159935, Retrieved from the Internet: URL:http://www.3gpp.org/ftp/tsg_ran/WG1_RL1/TSGR1_86b/Docs/ [retrieved on Oct. 1, 2016], 9 pages, Chapter 3.
Qualcomm Incorporated: "Resource Allocation for Autonomous UL Access", 3GPP Draft; R1-1718122 Resource Allocation For Autonomous UL Access, 3rd Generation Partnership Project (3GPP), Mobile Competence Centre ; 650, Route Des Lucioles ; F-06921 Sophia-Antipolis Cedex; FR, vol. RAN WG1, No. Prague, Czech; Oct. 9, 2017-Oct. 13, 2017, Oct. 8, 2017 (Oct. 8, 2017), XP051341304, 4 Pages, Retrieved from the Internet: URL:http://www.3gpp.org/ftp/Meetings_3GPP_SYNC/RAN1/Docs/ [retrieved on Oct. 8, 2017], Chapter 2.

* cited by examiner

AUTONOMOUS UPLINK TRANSMISSION USING SHARED RADIO FREQUENCY SPECTRUM

CROSS-REFERENCE TO RELATED APPLICATION(S)

This application claims benefit of and priority to U.S. Provisional Patent Application Ser. No. 62/658,425, filed Apr. 16, 2018, herein incorporated by reference in its entirety as if fully set forth below and for all applicable purposes.

BACKGROUND

Field of the Disclosure

The following relates generally to wireless communication, and more particularly, to methods and apparatus for facilitating autonomous uplink (AUL) transmission using shared (e.g., in a synchronized manner among one or more operators) radio frequency (RF) spectrum.

Description of Related Art

Wireless communications systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

Some wireless systems may enable communication between a base station and a UE over shared and/or unlicensed radio frequency spectrum bands, or over different radio frequency spectrum bands (e.g., licensed radio frequency spectrum bands and unlicensed radio frequency spectrum bands). When using a shared or unlicensed radio frequency spectrum band, transmitters (e.g., UEs, base stations, or other network access devices) may perform contention-based channel access (e.g., by performing a listen before talk (LBT) procedure) according to contention-based rules that provide for fair channel access to transmitters that wish to use the shared radio frequency spectrum band.

In some cases, a base station may schedule UEs for uplink (UL) communications through an assignment or grant of resources. In some cases, a base station may configure a UE to autonomously transmit uplink communications according to an autonomous uplink configuration. In such cases, the base station may not be aware of particular timings for uplink transmissions, due to the autonomous nature of such transmissions and due to the contention-based access to the shared radio frequency spectrum band.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

The described techniques relate to improved methods, systems, devices, or apparatuses that support autonomous uplink transmissions (AUL) using shared (e.g., in a synchronized manner among one or more operators) medium like radio frequency spectrum. For example, the described techniques provide for methods and apparatus for facilitating AUL transmission using shared radio frequency spectrum. In aspects, facilitating AUL transmission may include reducing and/or eliminating collision of an AUL transmission from a user equipment (UE) associated with a first operator with a transmission using the shared spectrum from another UE or a base station (BS) associated with the first operator or another operator.

For example, in an aspect of the disclosure, a method of wireless communication over a shared medium includes obtaining access to the shared medium for a transmission opportunity (TXOP), by a first BS associated with a first operator, based on AUL resources in the TXOP allocated to at least one UE served by the first BS and/or an indication from the at least one UE of AUL data, and receiving the AUL data from the at least one UE.

In an additional aspect of the disclosure, a first BS for wireless communication over a shared medium includes a memory and at least one processor coupled to the memory. The at least one processor is configured to obtain access to the shared medium for a TXOP based on AUL resources in the TXOP allocated to at least one UE served by the first BS and/or an indication from the at least one UE of AUL data, and to receive the AUL data from the at least one UE.

In an additional aspect, a non-transitory computer-readable medium stores one or more instructions for wireless communication over a shared medium by a BS. The one or more instructions, when executed by one or more processors of the first BS, causing the one or more processors to obtain access to the shared medium for a TXOP based on AUL resources in the TXOP allocated to at least one UE served by the first BS and/or an indication from the at least one UE of AUL data, and to receive the AUL data from the at least one UE.

In an additional aspect, a first BS for wireless communication over a shared medium includes means for obtaining access to the shared medium for a TXOP based on AUL resources in the TXOP allocated to at least one UE served by the first BS and/or an indication from the at least one UE of AUL data, and means for receiving the AUL data from the at least one UE.

For example, in an aspect of the disclosure, a method of wireless communication over a shared medium includes determining, by at least one UE served by a first BS associated with a first operator, access is obtained to the shared medium for a TXOP by the first BS based on AUL resources in the TXOP allocated to at least one UE served by the first BS and/or an indication from the at least one UE of AUL data, and transmitting the AUL data from the at least one UE to the first BS.

In an additional aspect of the disclosure, a UE for wireless communication over a shared medium includes a memory and at least one processor coupled to the memory. The at least one processor is configured to determine access is obtained to the shared medium for a TXOP by a BS serving the UE based on AUL resources in the TXOP allocated to the UE by the first BS and/or an indication from the at least one UE of AUL data, and to transmit the AUL data from the at least one UE to the first BS.

In an additional aspect, a non-transitory computer-readable medium stores one or more instructions for wireless communication over a shared medium by a UE, the one or more instructions, when executed by one or more processors of the UE, causing the one or more processors to determine access is obtained to the shared medium for a TXOP by a first BS serving the UE based on AUL resources in the TXOP allocated to the UE by the first BS or an indication from the at least one UE of AUL data, and to transmit the AUL data from the at least one UE to the first BS.

In an additional aspect, a UE for wireless communication over a shared medium includes means for determining access is obtained to the shared medium for a TXOP by a first BS serving the UE based on AUL resources in the TXOP allocated to the UE by the first BS and/or an indication from the at least one UE of AUL data, and means for transmitting the AUL data from the at least one UE to the first BS.

For example, in an aspect of the disclosure, a method of wireless communication by a UE associated with a first operator over a shared medium includes sensing for a reservation request (RRQ) signal and/or a reservation response (RRS) signal in a medium sensing period associated with a TXOP using the shared medium, determining the TXOP is available based on the sensing in the medium sensing period, sensing one or more portions of time and/or frequency resources in a transmission period associated with the TXOP, and transmitting AUL data to a BS based on the sensing in the transmission period.

In an additional aspect of the disclosure, a UE for wireless communication over a shared medium includes a memory and at least one processor coupled to the memory. The at least one processor is configured to sense for a RRQ signal and/or a RRS signal in a medium sensing period associated with a TXOP using the shared medium, to determine the TXOP is available based on the sensing in the medium sensing period, to sense one or more portions of time and/or frequency resources in a transmission period associated with the TXOP, and to transmit AUL data to a BS based on the sensing in the transmission period.

In an additional aspect, a non-transitory computer-readable medium stores one or more instructions for wireless communication over a shared medium by a UE. The one or more instructions, when executed by one or more processors of the UE, cause the one or more processors to sense for a RRQ signal and/or a RRS signal in a medium sensing period associated with a TXOP using the shared medium, to determine the TXOP is available based on the sensing in the medium sensing period, to sense one or more portions of time and/or frequency resources in a transmission period associated with the TXOP, and to transmit AUL data to a BS based on the sensing in the transmission period.

In an additional aspect, a UE for wireless communication over a shared medium includes means for sensing for a RRQ signal and/or a RRS signal in a medium sensing period associated with a TXOP using the shared medium, means for determining the TXOP is available based on the sensing in the medium sensing period, means for sensing one or more portions of time and/or frequency resources in a transmission period associated with the TXOP, and means for transmitting AUL data by the UE to a BS based on the sensing in the transmission period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
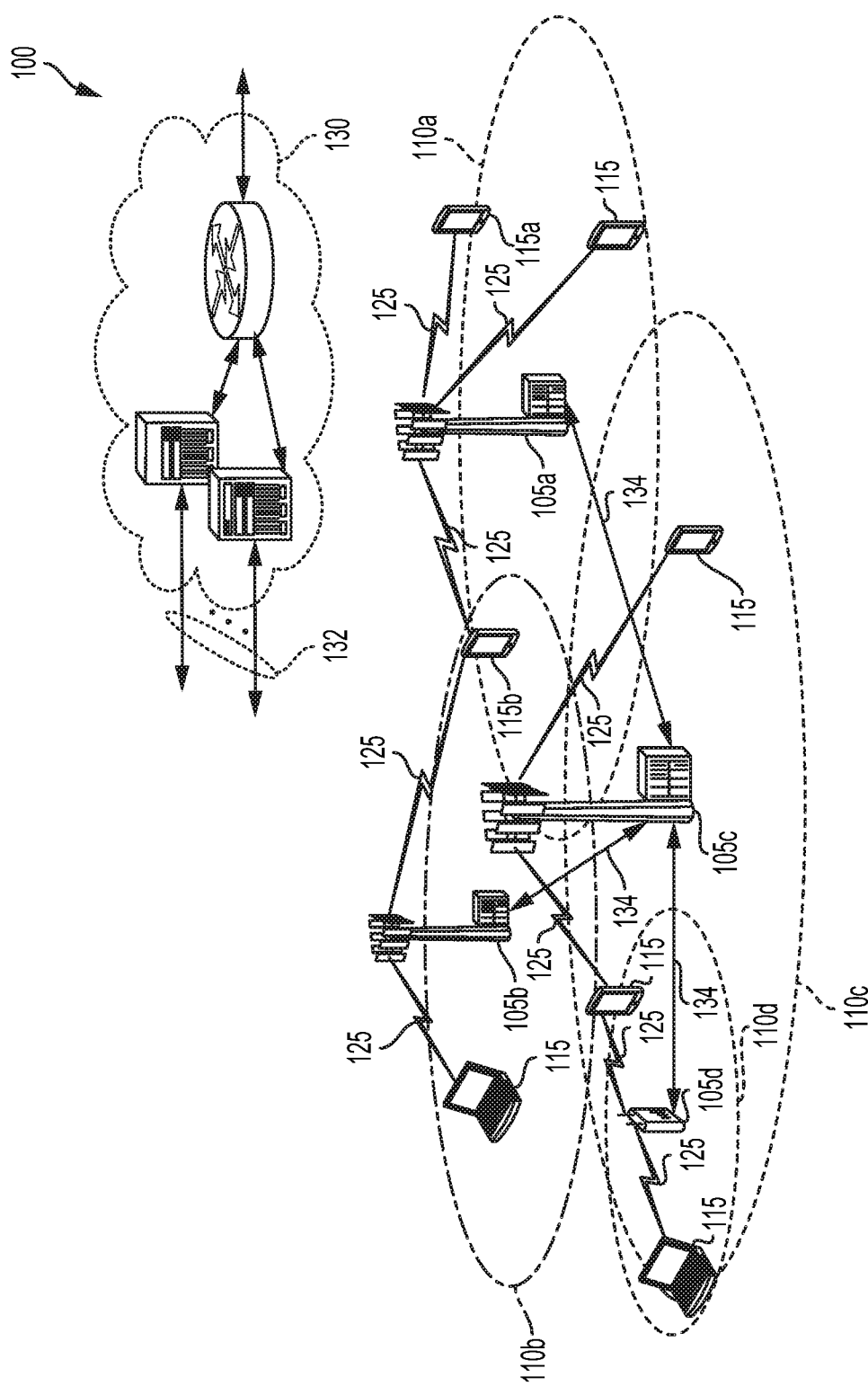
FIG. 1 illustrates an example of a system for wireless communication that facilitates autonomous uplink (AUL) transmission using shared radio frequency spectrum, in accordance with aspects of the present disclosure.

The described techniques relate to improved methods, systems, devices, and/or apparatuses that support autonomous uplink (AUL) transmissions using shared or unlicensed radio frequency spectrum. Generally, the described techniques provide for efficient coordination of AUL transmissions, and associated downlink transmissions through various signals, control information, waveform modification, and/or combinations thereof.

In some examples, unlicensed radio frequency spectrum bands may be used for Long Term Evolution (LTE), LTE-Advanced (LTE-A) and/or new radio (NR) (e.g., including NR short sequence (NR-SS) communication) communications. Unlicensed radio frequency spectrum may be used in combination with, or independent from, a dedicated or licensed radio frequency (RF) spectrum band. The dedicated RF spectrum band may include a RF spectrum band licensed to particular users for particular uses. The unlicensed or shared RF spectrum band may include a RF spectrum band available for Wi-Fi use, a RF spectrum band available for use by different radio access technologies (RATs), or a RF spectrum band available for use by multiple mobile network operators (MNOs) in an equally shared or prioritized manner. The terms unlicensed RF spectrum and shared RF spectrum are used interchangeably herein.

In wireless communications systems using shared medium like RF spectrum band available for use by multiple mobile network operators (MNOs) in an equally shared or prioritized manner, a wireless communication node (e.g., such as a user equipment (UE) or a base station (BS)) may use a listen-before-talk (LBT) procedure to resolve ambiguity and to mitigate potential for collisions that may arise in scenarios where more than one wireless communication node may want to transmit using shared RF spectrum. For example, for a transmission opportunity (TXOP) using the shared RF spectrum, a first operator may have a higher priority than a second operator which may have a higher priority than a third operator. During, another TXOP, different relative priorities may be employed. Stated another way, for each TXOP, a given operator has a pre-assigned sensing opportunity and can only transmit when the sensing is successful. The order of the sensing slot reflects the priority of the operator at each TXOP. If a given operator does not have data to transmit, the operator may not need to transmit a signal to reserve the medium even with successful sensing. In this way, the lower priority operator can use the medium opportunistically. However, based on the priorities, a wireless communication node associated with a first operator, for example, having a lower priority relative to a second operator sharing the RF spectrum band for a TXOP may be unable to access the shared RF spectrum band to schedule an uplink transmission and/or cause an uplink transmission to be scheduled in the TXOP. Such delay may be undesirable and/or inefficient.

Thus, UEs (e.g., associated with the first operator) in wireless communications systems using shared RF spectrum band may employ AUL transmissions. In some cases, a BS (e.g., associated with the first operator) serving such a UE may provision the UE with time and/or frequency resources of the shared RF spectrum band for possible AUL transmission(s). However, given the autonomous nature of such uplink transmission, the BS is unaware when the UE has data for such transmission, and therefore, may not contend for access to the shared RF spectrum band for wireless communication nodes associated with the first operator. Consequently, the AUL transmission by the UE may be delayed, which may be undesirable and/or inefficient.

The methods and apparatus described herein facilitate AUL transmission using shared RF spectrum. As described herein, the methods and apparatus provide support for AUL transmission in synchronized medium sharing. For example, the present methods and apparatus may reduce delays and/or collisions that may arise in scenarios where more than one wireless communication node may want to transmit using shared RF spectrum. Additionally, or alternatively, the methods and apparatus described herein may facilitate awareness of a UE wanting to transmit an AUL transmission (e.g., awareness of such UE by one or more wireless communication nodes in the wireless communications system using shared RF spectrum band available for use by multiple MNOs).

Aspects of the disclosure are further illustrated by and described with reference to apparatus diagrams, system diagrams, and flowcharts that relate to AUL transmission techniques using shared RF spectrum.

FIG. 1 illustrates an example of a system for wireless communication that facilitates autonomous uplink (AUL) transmission using shared RF spectrum, in accordance with aspects of the present disclosure. The network 100 includes BSs 105, UEs 115, and a core network 130. In some examples, the network 100 operates over a shared medium using shared RF spectrum. The shared RF spectrum may be unlicensed or partially licensed to one or more network operators. Access to the RF spectrum may be limited and may be controlled by a separate coordination entity. In some example, the network 100 may be a LTE network, or LTE Advanced (LTE-A) network, a millimeter wave (mmW) network, or a new radio (NR) network such as a 5G NR network or any other successor network to LTE. The network 100 may be operated by more than one network operator. Wireless resources may be partitioned and arbitrated among the different network operators for coordinated communication between the network operators over the network 100. According to certain aspects, a BS 105 associated with a first operator in the network 100 obtains access to the shared medium for a transmission opportunity (TXOP) based on AUL resources in the TXOP allocated to at least one UE 115 served by the BS 105 and/or based on an indication from the at least one UE 115 of AUL data. The BS 105 receives the AUL data from the at least one UE over the shared medium. According to certain aspects, a UE 115 in the network 100 may associated with a first operator. The UE 115 senses for a reservation request (RRQ) signal and/or a reservation response (RRS) signal, for example from a BS 105 or another UE 115, in a medium sensing period associated with a TXOP using the shared medium and the UE 115 determines the TXOP is available based on the sensing in the medium sensing period. The UE 115 senses one or more portions of time and/or frequency resources in a transmission period associated with the TXOP and transmits AUL data to a BS 105 based on the sensing in the transmission period.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100. Each UE 115 may be stationary or mobile. A UE 115 may also be referred to as a mobile station, a Customer Premises Equipment (CPE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, a smart phone, a gaming device, a netbook, a smartbook, an ultrabook, a medical device or medical equipment, a biometric sensor/device, a wearable device (e.g., a smart watch, smart clothing, smart glasses, smart wrist band, smart jewelry), an entertainment device (e.g., a music device, a video device, a satellite radio, etc.), a vehicular component, a smart meter, a smart sensor, an industrial manufacturing equipment, a global positioning system device, an Internet of things (IoT) device, an Internet of Everything (IoE) device, a machine type communication (MTC) device, an appliance, an automobile, a robot, a drone, a location tag, or other suitable device that is configured to communicate via a wireless or wired medium.

The BSs 105 may communicate with the core network 130 and with one another. The core network 130 may provide user authentication, access authorization, tracking, Internet Protocol (IP) connectivity, and other access, routing, or mobility functions. In 3GPP, the terms "cell", BSs and/or an evolved NodeB (eNB) may be used interchangeably. In NR systems, the terms "cell", BS, next generation NodeB (gNB), transmit/receive point (TRP), and/or an access node controller (ANC) may be used interchangeably. Also, although the term "BS" may generally refer to aspects of wireless wide area networks (WWANs) and "access point (AP)" may generally refer to aspects of wireless local area networks (WLANs), BS and AP may be used interchangeably.

The BSs 105 may interface with the core network 130 through backhaul links 132 (e.g., S1, S2, etc.) and may perform radio configuration and scheduling for communication with the UEs 115. In some examples, a cell may not necessarily be stationary, and the geographic area of the cell may move according to the location of a mobile BS. In various examples, the BSs 105 may communicate, either directly or indirectly (e.g., through core network 130), with each other over backhaul links 134 (e.g., X1, X2, etc.), which may be wired or wireless communication links, such as a direct physical connection, a wireless connection, a virtual network, or the like using any suitable transport network.

Each BS 105 may also communicate with a number of UEs 115 through a number of other BSs 105, where the BS 105 may be an example of a smart radio head. Various functions of each BS 105 may be distributed across various BSs 105 (e.g., radio heads and access network controllers) or consolidated into a single BS 105.

The downlink transmissions described herein may also be called forward link transmissions while the uplink transmissions may also be called reverse link transmissions. Each communication link described herein—including, for example, network 100 of FIG. 1—may include one or more carriers, where each carrier may be a signal made up of multiple sub-carriers (e.g., waveform signals of different frequencies).

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The wireless communications system or systems described herein may support synchronous or asynchronous operation. For synchronous operation, the BSs may have similar frame timing, and transmissions from different BSs may be approximately aligned in time. For asynchronous operation, the BSs may have different frame timing, and transmissions from different base stations may not be aligned in time. The techniques described herein may be used for either synchronous or asynchronous operations.

Figure 2:
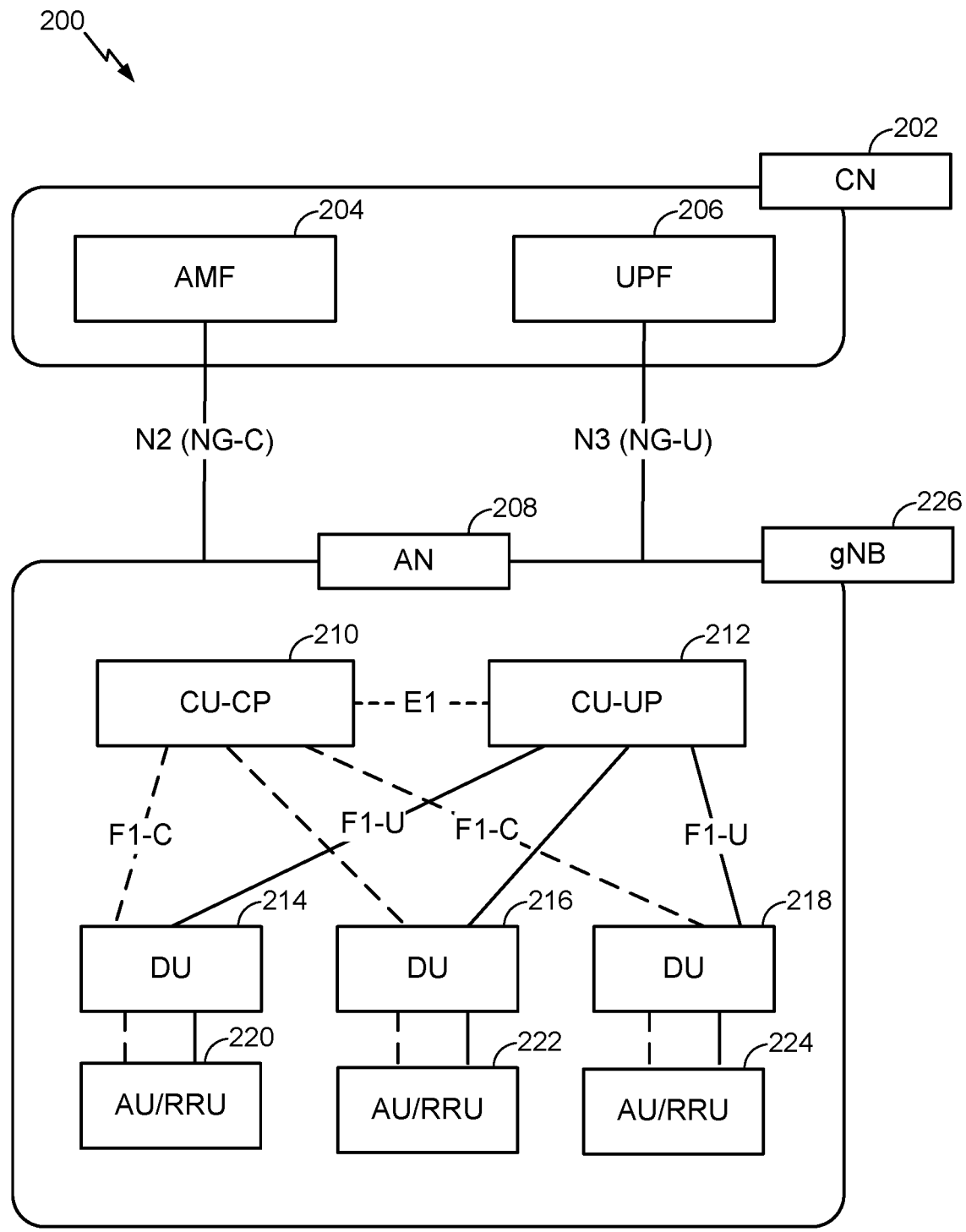
FIG. 2 is a block diagram illustrating an example architecture of a distributed radio access network (RAN), in accordance with certain aspects of the present disclosure.

In some examples, network 100 may be configured as a new radio (NR) network, and a BS 105 may be configured as a gNB. FIG. 2 illustrates an example architecture of a distributed Radio Access Network (RAN) 200, which may be implemented in the network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
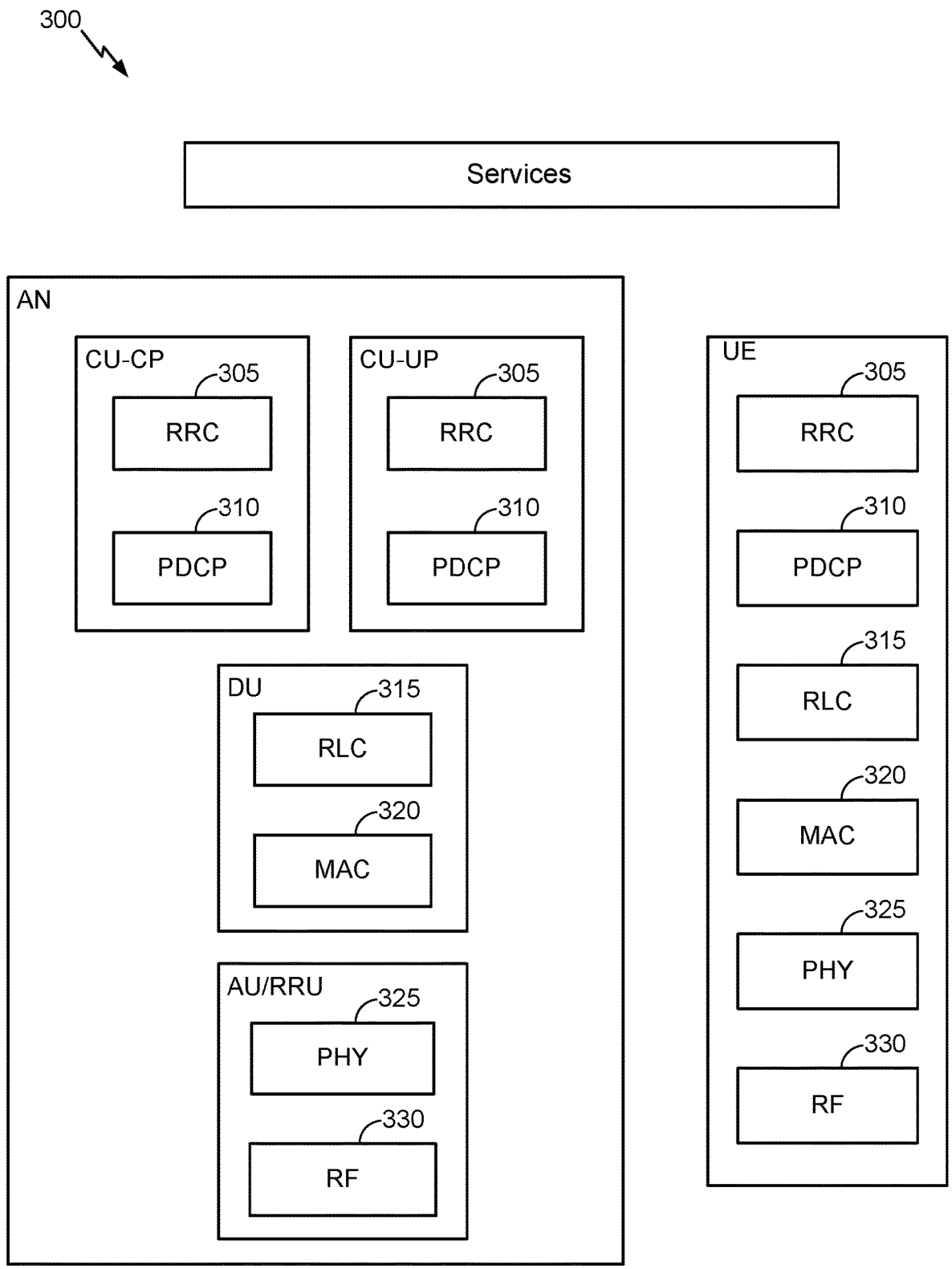
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

The BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into portions, for example, about 2.

In a frequency-division duplexing (FDD) mode, simultaneous UL and DL transmissions may occur in different frequency bands. Bidirectional communications may use FDD (e.g., using paired spectrum resources) or time division duplexing (TDD) operation (e.g., using unpaired spectrum resources). Frame structures for FDD and TDD may be defined. For example, each subframe includes a UL subframe in a UL frequency band and a DL subframe in a DL frequency band. In a time-division duplexing (TDD) mode, UL and DL transmissions occur at different time periods using the same frequency band. For TDD frame structures, each subframe may carry uplink or downlink traffic, and special subframes may be used to switch between downlink and uplink transmission. For example, a subset of the subframes (e.g., DL subframes) in a radio frame may be used for DL transmissions and another subset of the subframes (e.g., UL subframes) in the radio frame may be used for UL transmissions. NR may utilize OFDM with a CP on the uplink and downlink and include support for half-duplex operation using TDD.

Allocation of uplink and downlink subframes within radio frames may be symmetric or asymmetric and may be statically determined or may be reconfigured semi-statically. Special subframes may carry downlink or uplink traffic and may include a guard period (GP) between downlink and uplink traffic. Switching from uplink to downlink traffic may be achieved by setting a timing advance at the UE 115 without the use of special subframes or a guard period. Uplink-downlink configurations with switch-point periodicity equal to the frame period (e.g., 10 ms) or half of the frame period (e.g., 5 ms) may also be supported.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit references signals, such as cell-specific reference signals (CRSs) and/or channel state information-reference signals (CSI-RSs) to enable a UE 115 to estimate a DL channel. Similarly, a UE 115 may transmit reference signals such as sounding reference signals (SRSs) and/or demodulation reference signals (DM-RS) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

Figure 4:
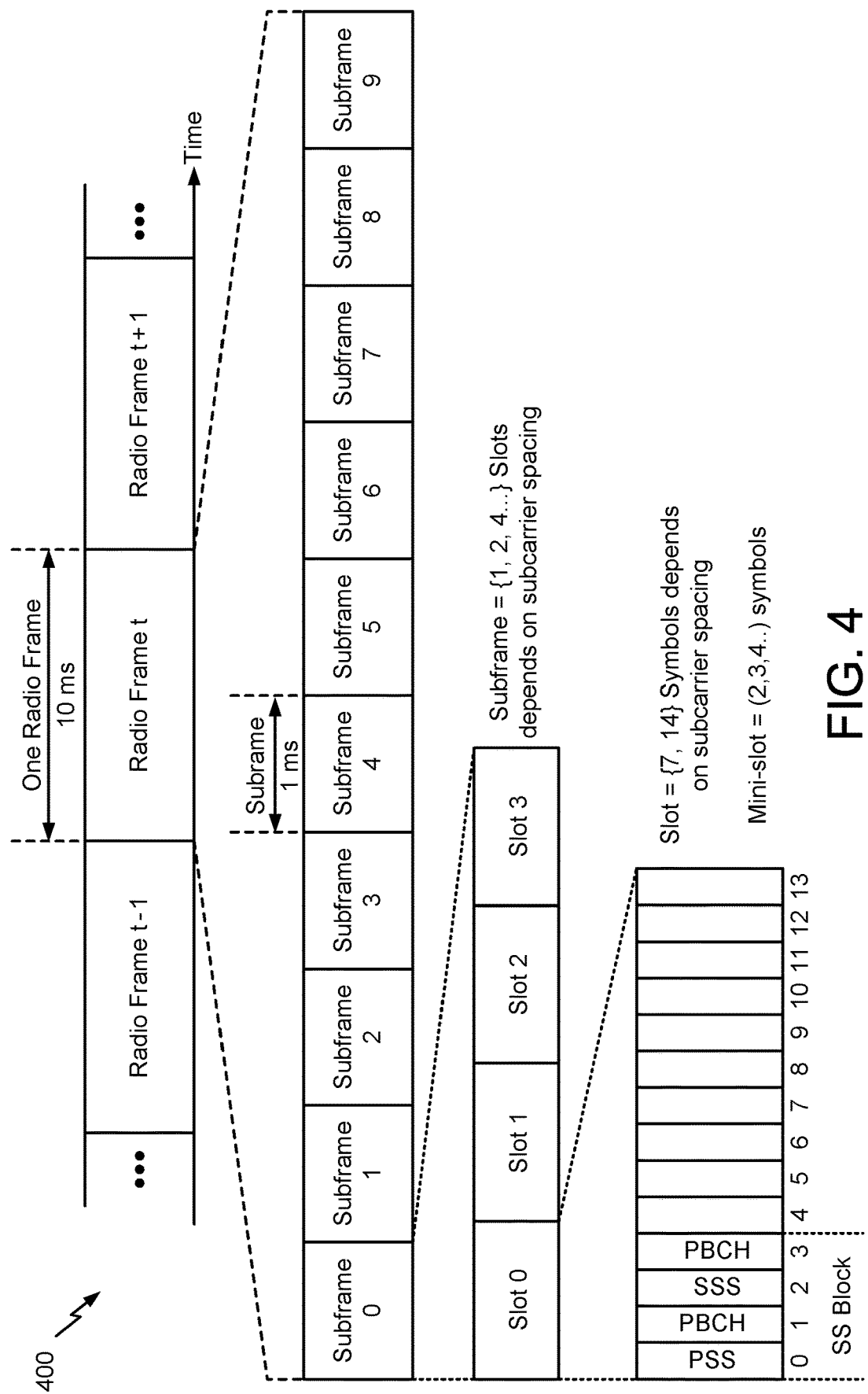
FIG. 4 illustrates an example of a frame format for a telecommunication system, in accordance with certain aspects of the present disclosure.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4 discussed in more detail below. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some examples, the UEs 115 and the BSs 105 may be operated by multiple network operators or network operating entities and may operate in a shared RF spectrum, which may include licensed or unlicensed frequency bands. The shared medium like spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared RF spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some examples, the central arbitrator may include a spectrum access system (SAS). In addition, the transmissions from the multiple network operating entities can be time synchronized to facilitate the coordination. Access to the spectrum within a particular network operating entity can be prioritized and interference between UL and DL can be controlled and managed.

In some examples, the network 100 may be configured as a MulteFire network, and a BS 105 may be configured as a MulteFire eNB or base station. The network 100 may include aspects of an LTE/LTE-A network, a Wi-Fi network, a MulteFire network, a neutral host small cell network, or the like, operating with overlapping coverage areas. A MulteFire network may include APs and/or base stations 105 communicating with UEs 115 in unlicensed radio frequency spectrum band, for example, without a licensed RF anchor carrier. For example, the MulteFire network may operate without an anchor carrier in licensed RF spectrum.

In some examples, UE 115 and BS 105 may operate in a shared RF spectrum band, which may include licensed RF spectrum, unlicensed RF spectrum, or a combination of licensed and unlicensed RF spectrum. For example, the network 100 may employ LTE License Assisted Access (LTE-LAA) or LTE Unlicensed (LTE-U) radio access technology or NR technology in an unlicensed band, for example, such as the 5 GHz Industrial, Scientific, and Medical (ISM) band. In an unlicensed frequency portion of the shared RF spectrum band, UEs 115 or BSs 105 may perform a medium-sensing procedure to contend for access to the RF spectrum. For example, a UE 115 or BS 105 may perform a listen-before-talk (LBT) procedure, such as a clear channel assessment (CCA), prior to communicating in order to determine whether the shared channel is available. The LBT procedure may include, for example, an LBT procedure associated with ETSI Frame Based Equipment (FBE). In some example, AUL transmissions may follow similar LBT rules as used for grant-based uplink transmissions, such as category 4 LBT rules.

A CCA may include an energy detection or energy sensing procedure to determine whether there are any other active transmissions. For example, each UE 115 may randomly choose a backoff counter (e.g., the backoff counter may be a certain duration or a number of symbols) and listen to a channel including resources the UEs 115 are contending for until the counter decrements to zero. If the counter reaches zero for a UE 115 and no other transmissions are detected, the UE 115 may start transmitting. If the counter does not reach zero before another signal is detected, the UE 115 has lost contention for resource and refrains from transmitting.

In some examples, a UE 115 may infer that a change in a received signal strength indicator (RSSI) indicates that a channel is occupied. Signal power that is concentrated in a certain bandwidth and that exceeds a predetermined noise floor may indicate the presence of another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

UEs 115 and BS 105 may employ a hybrid automatic repeat request (HARQ) feedback mechanism, which may be a method of ensuring that data is received correctly over a communication link 125. HARQ may include a combination of error detection, for example, using a cyclic redundancy check (CRC), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits (e.g., a redundancy version (RV) or a new data indicator (NDI)) are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

In some examples, unscheduled PUSCH transmissions may use asynchronous HARQ processes. For example, a UE 115 may send a retransmission upon receipt of a NACK, where a BS 105 may win contention for the medium to send the NACK feedback. Additionally or alternatively, retransmission may be based on receipt of NACK or a timer when no ACK/NACK feedback is received. In some cases, the timer may increase the chance of a PUSCH being received.

In some cases, a UE 115 may be detectable by a central BS 105 (or AP), but not by other UEs 115 in the coverage area 110 of the central BS 105. For example, one UE 115 may be at one end of the coverage area 110 of the central BS 105 while another UE 115 may be at the other end (e.g., a hidden node). Thus, both UEs 115 may communicate with the BS 105, but may not receive the transmissions of the other. This may result in colliding transmissions for the two UEs 115 in a contention based environment (e.g., carrier sense multiple access with collision avoidance (CSMA/CA)) because the UEs 115 may not refrain from transmitting on top of each other. A UE 115 whose transmissions are not identifiable, but that is within the same coverage area 110 may be known as a hidden node. In some examples, a UE 115 and BS 105 of interest may be referred to as a victim UE 115 or victim BS, respectively, in the presence of a potentially interfering neighbor UE 115 or BS (e.g., a hidden node), which may be further referred to as an aggressor UE 115 or aggressor BS.

Intra-cell UE ambiguity and transmission collisions may result in decreased system performance (e.g., due to timing synchronization issues). Intra-cell UE ambiguity and/or transmission collisions may arise in scenarios where two or more UEs 115 are unable to detect each other (e.g., the hidden node issue described above). In some cases, a grant may be used by a BS 105 to allocate resources to UEs 115. For autonomous uplink (AUL) scenarios, the BS 105 may detect the presence of the PUSCH and identify a UE 115 through a DMRS or scheduling request (SR). After one AUL UE 115 (e.g., a UE configured for AUL transmission) successfully contends the medium, the BS 105 may detect its PUSCH. However, since other intra-cell UEs 115 may not detect the DMRS and SR from this UE 115, another intra-cell UE (e.g., an aggressor) may also successfully contend the medium. As a result, the BS 105 may have a misaligned TDD configuration and frame start-timing, which may result in a collision between the transmissions from the two UEs 115. In some cases, a BS may enable or disable AUL transmissions at a UE 115 to reduce the likelihood of interference between multiple AUL transmissions, as will be discussed in further detail below.

FIG. 4 is a diagram showing an example of a frame format 600 for NR. Time intervals may be expressed in multiples of a basic time unit (e.g., a sampling period of $T_s=1/30{,}720{,}000$ seconds). Time resources may be organized according to radio frames of length of 10 ms ($T_f=307200T_s$), which may be identified by a system frame number (SFN) (e.g., with indices ranging from 0 to 1023). Each radio frame may have a predetermined duration (e.g., 10 ms) and may include ten 1 ms subframes (e.g., with indices numbered from 0 to 9). In LTE, a subframe may be further divided into two 0.5 ms slots, each of which contains 6 or 7 modulation symbol periods (depending on the length of the cyclic prefix prepended to each symbol). In NR, each subframe may include a variable number of slots depending on the subcarrier spacing. In LTE, excluding the cyclic prefix, each symbol may contain 2048 sample periods. However, in some cases, symbols may also have different durations. In NR, each slot may include a variable number of symbol periods (e.g., 7 or 14 symbols) depending on the subcarrier spacing. The symbol periods in each slot may be assigned indices. In LTE, the 1 ms subframe may be the smallest scheduling unit, also known as a transmission time interval (TTI) or packet duration. In other cases, a TTI may be shorter than a subframe or may be dynamically selected (e.g., in short TTI bursts or in selected component carriers using short TTIs). In NR, a subframe is still 1 ms, but the basic TTI is referred to as a slot, wherein the subframe contains a variable number of slots (e.g., 1, 2, 4, 8, 16, . . . slots) depending on the subcarrier spacing. A mini-slot, which may be referred to as a sub-slot structure, refers to a TTI having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

A resource element may consist of one symbol period and one subcarrier (a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

In some cases, the network 100 may be organized by transmission opportunities (TxOPs), which may be organized according to the frame structure described above and which a may be separated by periods of time during which the wireless medium may be unavailable for devices (e.g., UEs 115 or base stations 105) within wireless communications system 100.

In some cases, the network 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may include one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

As indicated above, one or more UEs 115 may operate in an autonomous (e.g., unscheduled) uplink mode. When operating in an AUL mode, UEs 115 may use an autonomous control channel (e.g., A-PUCCH) configuration. These A-PUCCH configurations may be configured according to UE 115 or system needs or constraints in various examples.

In some cases, the network 100 may support different uplink transmission configurations for different UEs 115 (e.g., mixed mode scheduling). That is, a first UE 115 may operate using AUL transmissions (which may be used in addition to scheduled uplink transmissions) and other UEs 115 may use scheduled uplink transmissions. Such mixed-mode scheduling may be associated with enhanced communications performance within the system, and a BS 105 may enable or disable AUL transmissions at different UEs 115 to provide such mixed-mode scheduling. As a result, configurations for UEs 115 that may operate using unscheduled and/or scheduled uplink transmissions may be determined by a serving base station 105.

A UE 115 configured for AUL may, in some examples, perform channel contention and gain access to a shared RF spectrum band, according to an AUL configuration that may be provided to the UE 115 by a BS 105. In some cases, the UE 115 may modify an uplink waveform or provide an indication to the BS 105 of one or more channel resources that may be available for BS 150 transmissions, in order to more fully utilize shared RF spectrum band resources within a maximum channel occupancy time (MCOT). In some examples, a CRC of a downlink control information (DCI) may be scrambled with an identification that indicates whether AUL transmissions are activated or deactivated at a particular UE 115. In some cases, the UE 115 and BS 105 may exchange various other control information to provide relatively efficient AUL transmissions and use of the shared RF spectrum band resources, as discussed herein. In some cases, the UE 115 and/or BS 105 may facilitate AUL transmission using shared RF spectrum as described herein. In aspects, the present methods and apparatus facilitate AUL transmission with FBE-based synchronized medium sharing.

Figure 5:
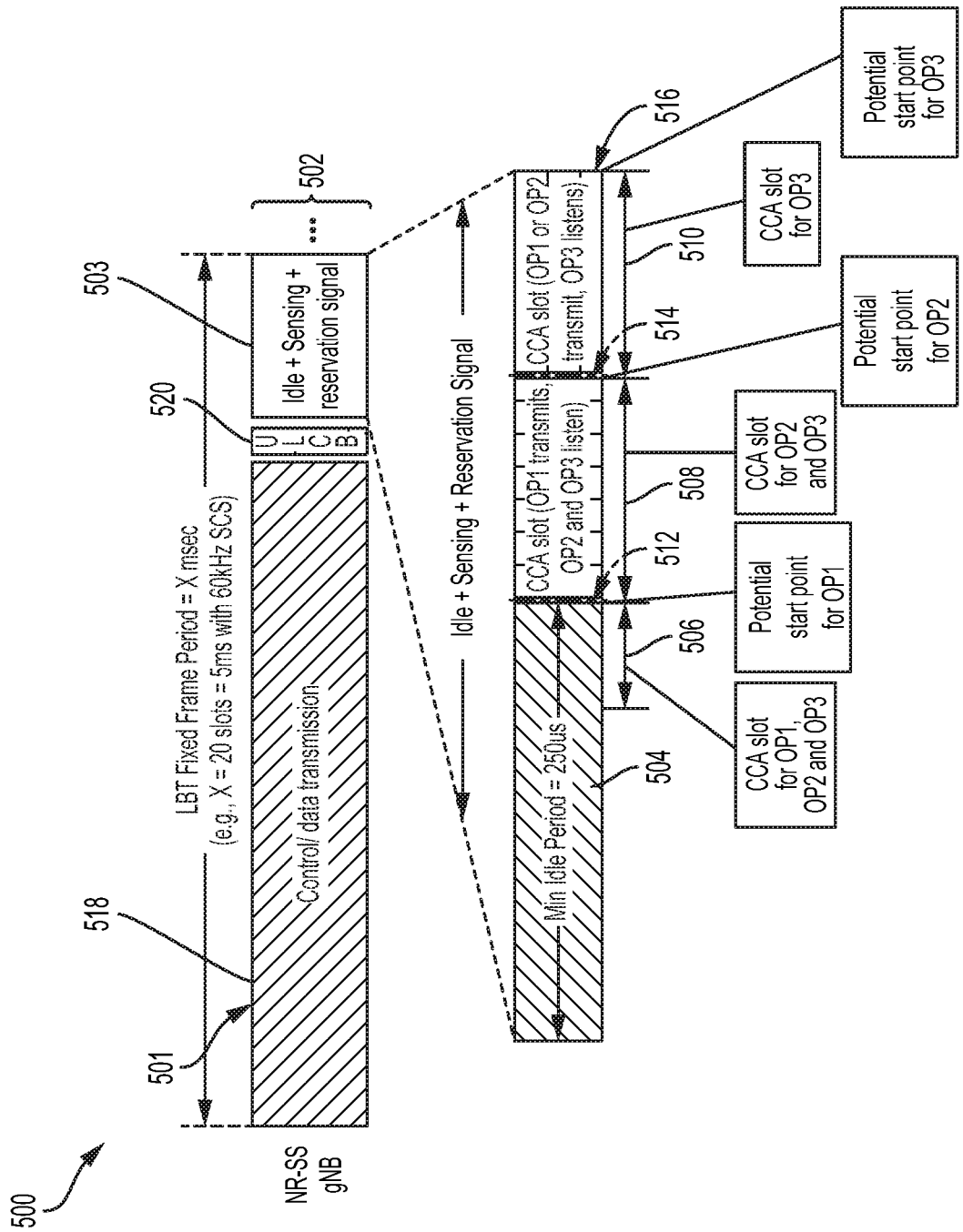
FIG. 5 illustrates exemplary communication using an example listen-before-talk (LBT) protocol, in accordance with aspects of the present disclosure.

FIG. 5 illustrates exemplary communication 500 using an example listen-before-talk (LBP) protocol in accordance with aspects of the present disclosure. The exemplary communication employs a wireless communication structure 501 that accommodates a LBT procedure. The wireless communication structure 501 may be associated with a transmission opportunity (TXOP) 502. The wireless communication structure 501 may be employed by one or more wireless communication nodes in a system that supports Frame Based Equipment (FBE)-based synchronized medium sharing. As shown, the wireless communication structure 501 may represent a frame of X milliseconds (ms). For example, in a communication system having 60 kHz subcarrier spacing (SCS), X may equal 5 ms, and the wireless communication structure 501 may include 20 slots. The wireless communication structure 501 can include a contention-based access period 503. The contention-based access period 503 may include a plurality of slots. For example, the contention-based access period 503 may include an idle period 504. The idle period 504 may have a minimum duration of 250 µs, for example. The contention-based access period 503 may include a plurality of CCA periods or slots. For example, the contention-based access period 503 may include a first CCA period or slot 506, a second CCA period or slot 508 and a third CCA period or slot 510.

In a system that supports FBE-based synchronized medium sharing, the shared RF spectrum band may available for use by multiple mobile network operators (MNOs) in a prioritized manner. For example, at least a first network operator (OP1) may have priority over a second network operator (OP2), which may have priority of a third network operator (OP3). Thus, during the first CCA period or slot 506, one or more wireless communication nodes associated with OP1, OP2 and/or OP3 may perform the LBT procedure (e.g., including sensing for a reservation signal from another wireless communication node associated with one of the operators), with priority of access to a wireless communication node associated to OP1.

For a wireless communication node associated to OP1 that wants access to the shared RF spectrum band, a potential start point 512 for a communication for such wireless communication node associated with OP1 follows the first CCA period or slot 506. During the second CCA period or slot 508, one or more wireless communication nodes associated with OP2 and/or OP3 may perform the LBT procedure (e.g., including sensing for a reservation signal from another wireless communication node associated with one of the operators), with priority of access to a wireless communication node associated with OP2, assuming OP1 is not accessing the shared RF spectrum. In aspects, a wireless communication node of OP1 may be transmitting using the shared spectrum. Assuming a wireless communication node associated with OP2 wants access to the shared frequency spectrum band, a potential start point 514 for a communication for such wireless communication node associated with OP2 follows the second CCA period or slot 508. Similarly, during the third CCA period or slot 510, one or more wireless communication nodes associated with OP3 may perform the LBT procedure (e.g., including sensing for a reservation signal from another wireless communication node associated with one of the operators), with priority of access to a wireless communication node associated to OP3, assuming OP1 and OP2 are not accessing the shared radio frequency spectrum. Assuming a wireless communication node associated to OP3 wants access to the shared RF spectrum band, a potential start point 516 for a communication for such wireless communication node associated with OP3 follows the third CCA slot 510, and so on. In this manner, the contention-based access period 503 may include an idle period, a sensing period, and a reservation signal.

The wireless communications structure 501 may include a first portion 518 for communication of control and/or data information by a wireless communication node. The wireless communications structure 501 may include a second portion 520 for communication of an uplink control block (ULCB) by a wireless communication node. For example, a BS 105, such as a NR-SS gNB, may employ the first portion 518 to transmit control and/or data information to a UE 115 served by the BS 105 and receive an ULCB in the second portion 520. Although a frame length of 5 ms and three operators are described with reference to FIG. 5, employing a smaller burst length and/or a larger number of operators may provide more flexibility but use higher sensing overhead.

Figure 6:
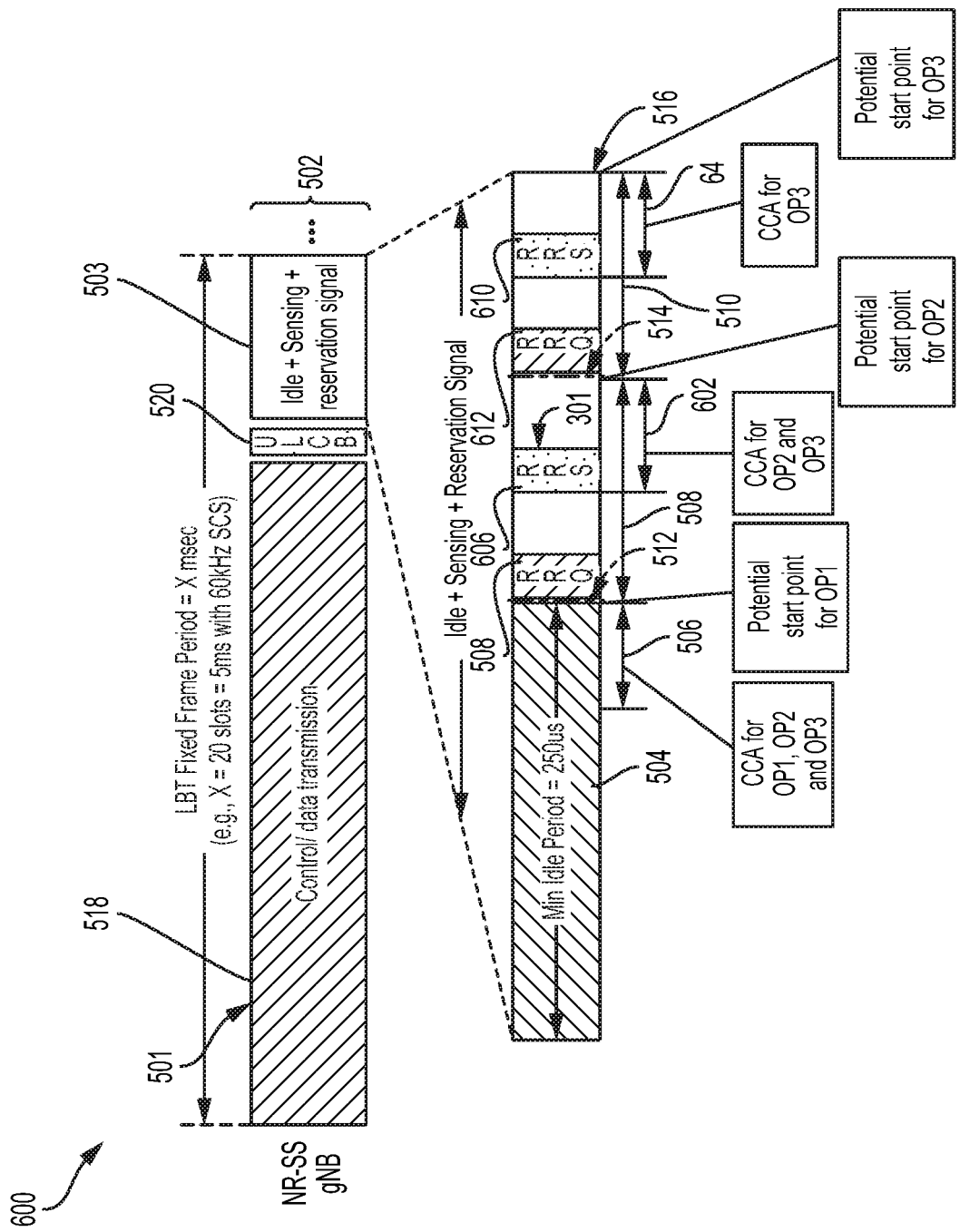
FIG. 6 illustrates medium sensing in the exemplary communication using an example LBT protocol of FIG. 5, in accordance with aspects of the present disclosure.

FIG. 6 illustrates medium sensing in the exemplary communication 600 using an example LBT protocol of FIG. 5, in accordance with aspects of the present disclosure. A CCA period or slot 506, 508, 510 of the wireless communication structure 501 may include a medium sensing portion. During the CCA period or slot 506, 508, 510 energy based sensing of the medium and/or sensing or detecting of signaling associated with message-based medium sharing may be performed. For example, the CCA period or slot 506, 508, 510 may define, account for, and/or otherwise accommodate a reservation response signal (RRS) and/or reservation request (RRQ) signal. The sensing may be based on RRS detection or RRS energy measurement. RRQ and RRS are just one example of signals to reserve the medium for a given operator and to silence the potential transmission from other operators. Another example could be request-to-send (RTS) and clear-to-send (CTS) signals (e.g., as used in Wi-Fi terminology).

Such medium sensing portion may include a portion 601 to account for and/or accommodate a RRS from a wireless communication node expecting to receive a communication in the TXOP 502. For example, the second CCA period of slot 508 may include a medium sensing portion 602. During the medium sensing portion 602, one or more wireless communication nodes associated with the second and/or third operators OP2, OP3 may sense for a first RRS 606, for example, from one or more wireless communication nodes associated with the first network operator OP1 or second network operator OP2. The first RRS 606 may be in response to a first RRQ 608, for example, from a BS 105 associated with the first network operator OP1 or second network operator OP2. The RRQ 608 may be transmitted by a wireless communication node expecting to transmit a communication in the TXOP 502. Similarly, the third CCA period of slot 510 may include a medium sensing portion 604. During the medium sensing portion 604, one or more wireless communication nodes associated with the third operators OP3 may sense for a second RRS 610, for example, from one or more wireless communication nodes associated with the first network operator OP1, second network operator OP2, or third network operator OP3. The second RRS 610 may be in response to a second RRQ 612, for example, from a BS 105 associated with the first network operator OP1, second network operator OP2, or third network operator OP3. Each RRQ 608, 612 may include a predetermined preamble sequence, a RTS signal, and/or transmission triggers (e.g., scheduling information). Each RRS 606, 610 may include a predetermined preamble sequence or a CTS signal. The CCA periods or slots 506, 508, 510 can be arranged in a decreasing order of priorities. Thus, a low-priority operator node may monitor the channel (e.g., the shared radio frequency band) in the CCA periods 506 of higher priorities.

Upon detection of a reservation from a high-priority operator node, the low-priority operator node may refrain from transmitting in a following transmission period of the TXOP 502. In this manner, a BS 105 of an operator may cause reservation of one or more portions of a TXOP 502. The BS 105 may reserve such portion of the TXOP 502 based on wanting to transmit downlink control information and/or data. However, even if a BS 105 associated with a low-priority operator wants to transmit downlink control information and/or data, such BS 105 may be unable to reserve the TXOP 502 if a higher-priority BS reserves the TXOP 502.

A UE 115 associated with an operator may be time-synchronized with a BS 105 associated with the operator, and may be capable of unscheduled or AUL transmissions to BS 105. However, as described above, a BS 105 serving such a UE 115 may reserve such portion of the TXOP 502 if the BS 105 wants to transmit downlink control information and/or data, and if the BS 105 is associated with a low-priority operator, such BS 105 may be unable to reserve the TXOP 502 despite the BS 105 wanting to reserve the TXOP 502.

As described further below and herein, the present methods and apparatus provide support for AUL transmission in synchronized medium sharing. For example, the present methods and apparatus may reduce delays and/or collisions that may arise in scenarios where more than one wireless communication node may want to transmit using shared RF spectrum. Additionally, or alternatively, the present methods and apparatus may facilitate awareness of a UE wanting to transmit an AUL transmission, such as awareness of such UE by one or more wireless communication nodes in the wireless communications systems using shared RF spectrum band available for use by multiple MNOs.

Figure 7:
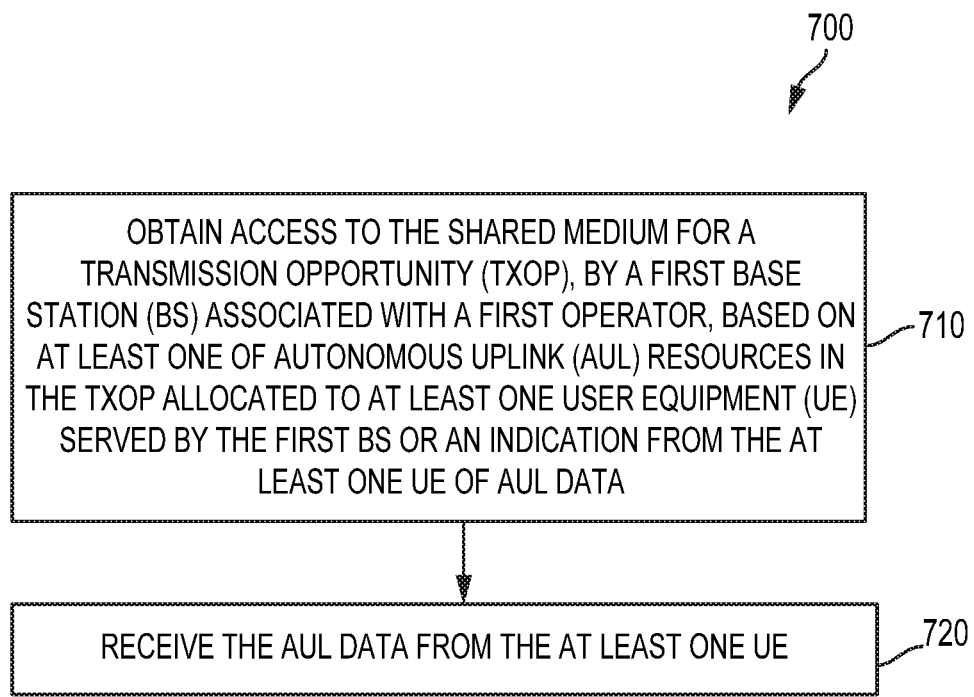
FIG. 7 illustrates an example of a process flow of wireless communication over a shared medium by a base station (BS), in accordance with aspects of the present disclosure.

FIG. 7 illustrates an example of a process flow for a method 700 of wireless communication over a shared medium, in accordance with aspects of the present disclosure. The method 700 may be performed, for example, by a BS (e.g., such as a BS 105 in the network 100 shown in FIG. 1). Steps of the method 700 can be executed by a computing device (e.g., a processor, processing circuit, and/or other suitable component) of a BS 105. The method 700 may facilitate SUL transmission using shared RF spectrum. For example, the method 700 may be useful in systems for wireless communication using shared RF spectrum in which a UE 115 associated with a first operator is unable to transmit an AUL transmission in a portion of a TXOP, despite having been allocated resources in the TXOP for the AUL transmission by a BS 105 serving the UE 115, unless such portion of the TXOP has been reserved by a wireless communication node (e.g., a BS 105 or UE 115) associated with the first operator. In such systems, an AUL transmission is gated by a TXOP reservation. That is to say, if a wireless communication node associated with the first operator does not reserve the TXOP, the UE 115 associated with the first operator is unable to transmit the AUL transmission. Effectively, an AUL transmission from a UE 115 may be based (e.g., is triggered and/or conditioned) on whether or not the BS (e.g., which may be a gNB) serving the UE 115 has reserved the shared RF spectrum (e.g., medium).

In some cases, however, a BS 105 serving such UE 115 may be unaware of when the UE 115 has data (e.g., has buffered data) for an AUL transmission. Hence, rather than sending a RRQ and/or RRS signal to reserve the medium if (e.g., only if) such BS 105 has downlink control information (DCI) and/or data to send, the BS 105 contends (e.g., will always contend) for the medium in a TXOP if the BS 105 has allocated AUL resources in the TXOP. Thus, the BS 105 may contend for the medium irrespective whether a UE 115 served by the BS 105 has AUL data for transmission or not.

As shown in FIG. 7, the method 700 of wireless communication includes a number of enumerated steps. In some examples, the method 700 may include additional steps before, after, and/or in between the enumerated steps. In some examples, one or more of the enumerated steps may be omitted or performed in a different order.

At step 710, the method 700 includes obtaining access to the shared medium for a TXOP, by a first BS associated with a first operator, based on AUL resources in the TXOP allocated to at least one UE served by the first BS and/or an indication from the at least one UE of AUL data. For example, the BS 105 may reserve access for the TXOP if AUL resources in the TXOP have been allocated by the BS 105 or another wireless communication node associated with the first operator.

At step 720, the method 700 includes receiving the AUL data from the at least one UE. In some examples, obtaining access to the shared medium for the TXOP includes contending by the first BS, associated with the first operator, with another BS (i.e., a second BS) associated with a second operator for access to the shared medium for the TXOP. In some examples, obtaining access to the shared medium for the TXOP includes employing a modified medium reservation slot and receiving the indication from the at least one UE of AUL data in the modified medium reservation slot. The modified medium reservation slot includes one or more indications from one or more UEs, respectively, of AUL data when the first BS or second BS has allocated AUL resources for the TXOP. In some examples, the method 700 may further include employing a default medium reservation slot when the first BS or the second have not allocated AUL resources for an associated TXOP. In some examples, the indication from the at least one UE of AUL data includes a RRQ signal. In some examples, the method 700 includes receiving the RRQ signal from the at least one UE without transmitting a RRQ signal from the first BS. In some examples, the method 700 includes determining a RRS signal from a UE or second BS, associated with a second operator (e.g., of a higher priority than the first operator), is not detected by the first BS.

By employing the method 700, a BS 105 serving a UE 115 may facilitate an AUL transmission by such UE 115 despite being unaware of when the UE 115 has data for an AUL transmission. In some cases, a BS may reserve shared medium unnecessarily (e.g., even if the UE does not have AUL data to send in such shared medium) resulting into medium waste. Additionally or alternatively, by employing the method 700, a BS 105 serving a UE 115 may facilitate an AUL transmission by such UE 115 based on awareness, by the BS 105, of the UE 115 wanting to transmit an AUL transmission. The awareness by the BS 105 may be facilitated by the UE 115.

Figure 8:
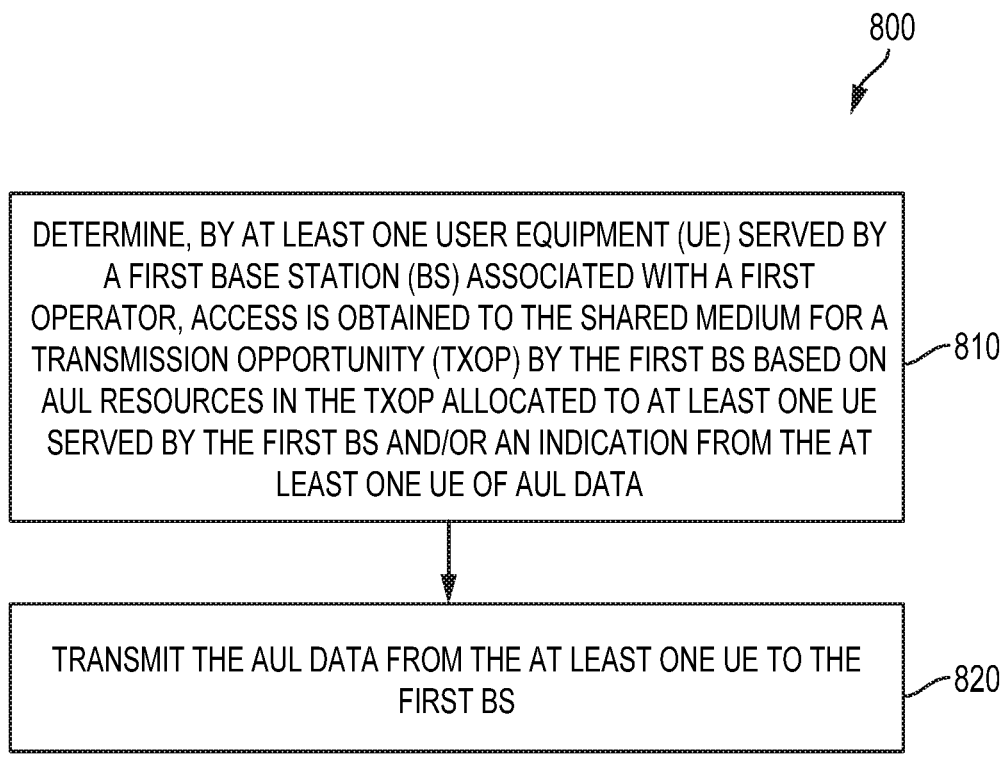
FIG. 8 illustrates an example of a process flow of wireless communication over a shared medium by a user equipment (UE), in accordance with aspects of the present disclosure.

FIG. 8 illustrates an example of a process flow for a method 800 of wireless communication over a shared medium, in accordance with aspects of the present disclosure. The method 800 may be performed, for example, by a UE (e.g., such as a UE 115 in the network 100 shown in FIG. 1). Steps of the method 800 can be executed by a computing device (e.g., a processor, processing circuit, and/or other suitable component) of a UE 115. The method 800 may facilitate AUL transmission using shared RF spectrum. For example, similar to aspects of the method 700, aspects of the method 800 may be useful in systems for wireless communication using shared RF spectrum in which a UE 115 associated with a first operator is unable to transmit an AUL transmission in a portion of a TXOP unless such portion of the TXOP has been reserved by a wireless communication node (e.g., a BS 105 or UE 115) associated with the first operator. Such UE 115 may be unable to transmit the AUL transmission despite having been allocated resources in the TXOP for the AUL transmission by a BS 105 serving the UE 115. Aspects of the method 800 performed by a UE 115 may be complementary to the method 700 performed by a BS 105 (e.g., serving the UE 115).

The method 800 of wireless communication includes a number of enumerated steps. In some examples, the method 800 may include additional steps before, after, and/or in between the enumerated steps. In some examples, one or more of the enumerated steps may be omitted or performed in a different order.

At step 810, the method 800 includes determining, by at least one UE served by a first BS associated with a first operator, access is obtained to the shared medium for a TXOP by the first BS based on AUL resources in the TXOP allocated to at least one UE served by the first and/or an indication from the at least one UE of AUL data. In some examples, determining access is obtained by the first BS may be determined, or assumed, based on allocation of AUL resources in the TXOP by a wireless communication node associated with the first operator. In some examples, determining access is obtained to the shared medium for a TXOP by the first BS based on AUL resources in the TXOP allocated to at least one UE served by the first BS includes determining the at least one UE has been allocated AUL resources for the TXOP, and therefore (based on that determination), determining, or assuming, the BS 105 has reserved the TXOP based on such allocation. In some examples, determining access is obtained to the shared medium for a TXOP by the first BS based on an indication from the at least one UE of AUL data includes the UE transmitting an indication of AUL data (e.g., AUL data buffered by the UE 115) to the BS 105, and determining the BS 105 has reserved the TXOP based on such indication.

At step 820, the method 800 includes transmitting the AUL data from the at least one UE to the BS. In aspects, determining access is obtained to the shared medium for the TXOP includes determining the first BS, associated with the first operator, contends with another BS (i.e., a second BS) associated with a second operator for access to the shared medium, for the TXOP based on AUL resources allocated to at least one UE served by the first BS in the TXOP or an indication from the at least one UE of AUL data. In some examples, the method 800 further comprises employing a modified medium reservation slot including one or more indications from one or more UEs, respectively, of AUL data when the first BS or second BS has allocated AUL resources in the TXOP, and transmitting the indication from the at least one UE of AUL data in the modified medium reservation slot to the first BS. In some examples, the method 800 further comprises employing a default medium reservation slot when the first BS and second BS have not allocated AUL resources (e.g., neither BS has allocated AUL resources) for an associated TXOP. In some examples, the default medium reservation slot (e.g. 508 in FIG. 5) may not account for the indication from the UE 115, while the modified medium reservation slot accounts for such indication as described below in FIG. 9.

In some examples, the method 800 further comprises transmitting the indication from the at least one UE of AUL data in the modified medium reservation slot to the BS. In some examples, the indication from the at least one UE of AUL data includes a RRQ signal. The at least one UE 115 may transmit the indication when the UE 115 has AUL data to transmit (e.g., when the UE 115 has buffered AUL data). In some examples, transmitting the RRQ signal from the UE includes transmitting the RRQ signal from the UE without detecting a RRQ signal from the first BS. In this manner, the UE 115 may cause the BS 105 to contend for and/or obtain access to the shared medium for the TXOP regardless of whether the BS 105 has downlink data to transmit during the TXOP.

In some examples, the method 800 further comprises determining a RRS signal from a UE or second BS, associated with a second operator (e.g., of a higher priority than the first operator), is not detected by the at least one UE. In this manner, a UE 115 with AUL data to transmit may determine a TXOP may be unused by other wireless communication nodes in the network 100, and transmit the AUL data in such TXOP regardless of whether wireless communication node of the operator associated with the UE 115 has obtained access to the shared medium. For example, such UE 115 may transmit the AUL transmission in the TXOP even if the wireless communication node of the operator associated with the UE 115 has not obtained access to the shared medium.

In this manner, by employing the method 800, in aspects, AUL transmission by such UE 115 may be facilitated (e.g., despite a BS 105 serving such UE 115 being unaware of when the UE 115 has data for an AUL transmission).

Figure 9:
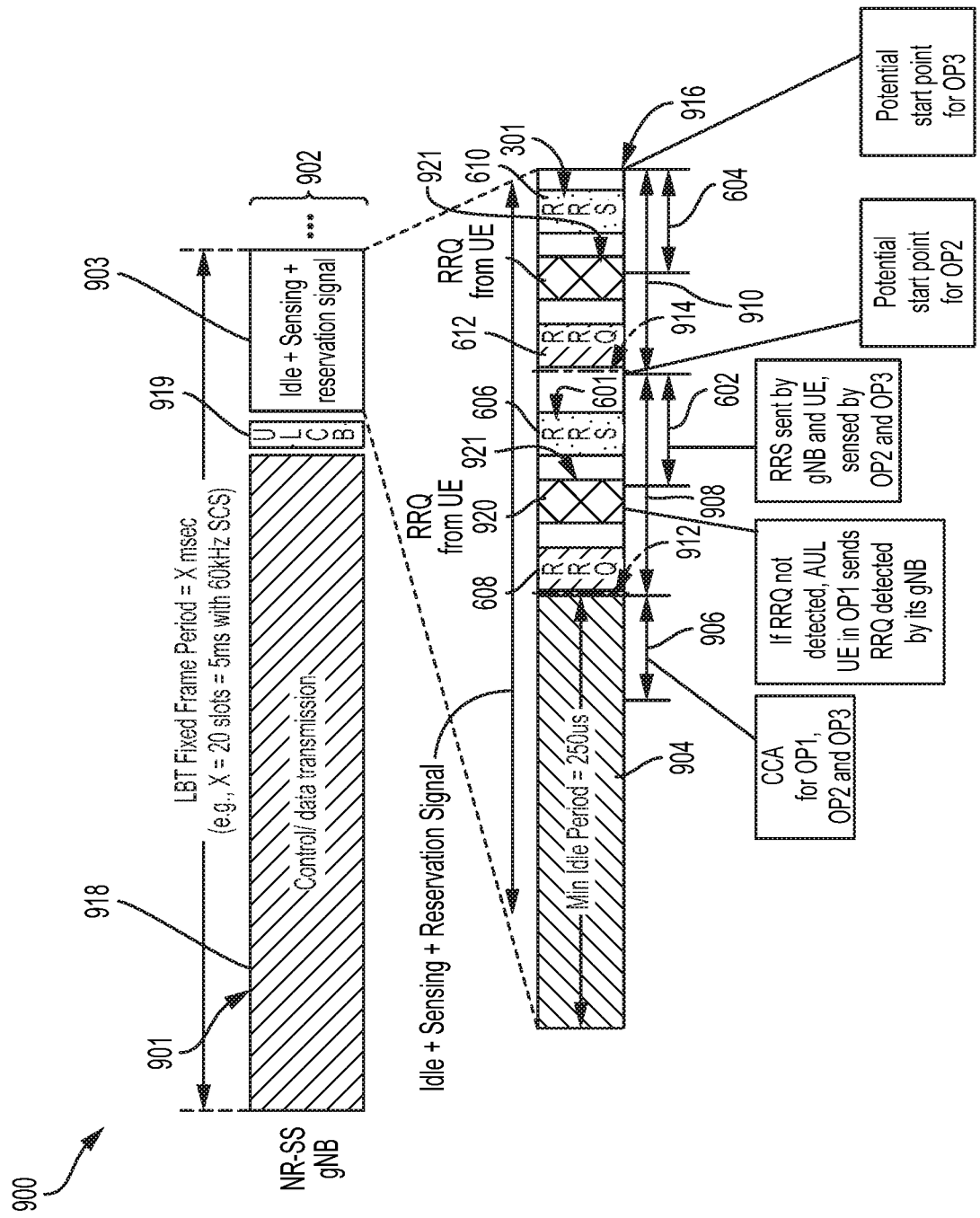
FIG. 9 illustrates exemplary wireless communication over a shared medium using an example LBT procedure, in accordance with aspects of the present disclosure.

FIG. 9 illustrates exemplary wireless communication 900 over a shared medium using an example LBT procedure, in accordance with aspects of the present disclosure. The exemplary communication 900 employs a wireless communication structure 901 that accommodates a LBT procedure. The exemplary wireless communication structure 901 may be similar to the exemplary wireless communication structure 501 described with reference to FIG. 5 and FIG. 6.

The wireless communication structure 901 may be associated with a TXOP 902. The wireless communication structure 901 may be employed by one or more wireless communication nodes in a system that supports FBE-based synchronized medium sharing. As shown, the wireless communication structure 901 may represent a frame of X ms. For example, in a communication system having 60 kHz SCS, X may equal 5 ms, and the wireless communication structure 901 may include 20 slots. The wireless communication structure 901 includes a contention-based access period 903. The contention-based access period 903 may include a plurality of slots. For example, the contention-based access period 903 may include an idle period 904. The idle period 904 may be five percent (5%) of the Channel Occupancy Time, with a minimum of 100 µs, for example. When the frame duration is chosen to be 5 ms, the idle period is a minimum of 250 µs, for example. The contention-based access period 903 may include a plurality of CCA periods or slots. For example, the contention-based access period 903 may include a first CCA period or slot 906, a second CCA period or slot 908, and a third CCA period or slot 910.

In a system that supports FBE-based synchronized medium sharing, the shared RF spectrum band may available for use by multiple MNOs in a prioritized manner. For example, at least a first network operator (OP1) may have priority over a second network operator (OP2), which may have priority of a third network operator (OP3). Thus, during the first CCA period or slot 906, one or more wireless communication nodes associated with OP1, OP2 and/or OP3 may perform the LBT procedure (e.g., including sensing for a reservation signal from another wireless communication node associated with one of the operators), with priority of access to a wireless communication node associated to OP1. Assuming a wireless communication node associated to OP1 wants access to the shared RF spectrum band, a potential start point 912 for a communication for such wireless communication node associated with OP1 follows the first CCA period or slot 906. During the second CCA period or slot 908, one or more wireless communication nodes associated with OP2 and/or OP3 may perform the LBT procedure (e.g., including sensing for a reservation signal from another wireless communication node associated with one of the operators), with priority of access to a wireless communication node associated to OP2, assuming OP1 is not accessing the shared RF spectrum. Assuming a wireless communication node associated to OP2 wants access to the shared RF spectrum band, a potential start point 914 for a communication for such wireless communication node associated with OP2 follows the second CCA period or slot 908. During the third CCA period or slot 910, one or more wireless communication nodes associated with OP3 may perform the LBT procedure (e.g., including sensing for a reservation signal from another wireless communication node associated with one of the operators), with priority of access to a wireless communication node associated to OP3, assuming OP1 and OP2 are not accessing the shared RF spectrum. Assuming a wireless communication node associated with OP3 wants access to the shared RF spectrum band, a potential start point 916 for a communication for such wireless communication node associated with OP3 follows the third CCA slot 910, and so on.

The wireless communications structure 901 may include a first portion 918 for communication of control and/or data information by a wireless communication node. The wireless communications structure 901 may include a second portion 919 for communication of a ULCB by a wireless communication node. For example, a BS 105, such as a NR-SS gNB, may employ the first portion 918 to transmit control and/or data information to a UE 115 served by the BS 105 and receive an ULCB in the second portion 920.

In contrast to the exemplary wireless communication structure 501, one or more CCA periods or slots 906, 908, 910 of the exemplary wireless communication structure 901 may include a portion 921 to account for and/or accommodate for one or more indications from the UE 115 (e.g., of AUL data to be transmitted). For example, the second CCA period or slot 908 may account for and/or accommodate RRQ 920 transmitted from the UE 115. The RRQ 920 may cause a BS 105 serving the UE 115 to reserve the TXOP 902. The UE 115 may transmit the RRQ 920, for example, when the UE 115 has AUL data and the UE 115 has not detected a RRQ 608 from a wireless communication node (e.g., a BS 105 serving the UE 115) of an operator associated with the UE 115. A RRS from wireless communication node expected to receive a communication in the TXOP 902 may be communicated in a portion 601 of the contention-based access period 903. A RRS from wireless communication node expected to transmit a communication in the TXOP 902 may be communicated in the portion 601. Thus, a medium sensing slot 908, 912 may account for RRQ from AUL UEs in addition to RRQ from a gNB. In this manner, a modified wireless communication structure 901, compared to the default exemplary wireless communication structure 501, is provided that facilitates awareness of a UE wanting to transmit an AUL transmission. By modifying the medium reservation slot to reflect or indicate the AUL transmission, a BS 105 (which may be a gNB) is made aware of AUL data in order to reserve the medium. In some examples, the medium sensing overhead may be increased to accommodate potential AUL transmission. For example, there may be a dedicated time for an AUL UE to send UL RRQ, in addition to a DL RRQ (e.g., from a BS 105).

Figure 10:
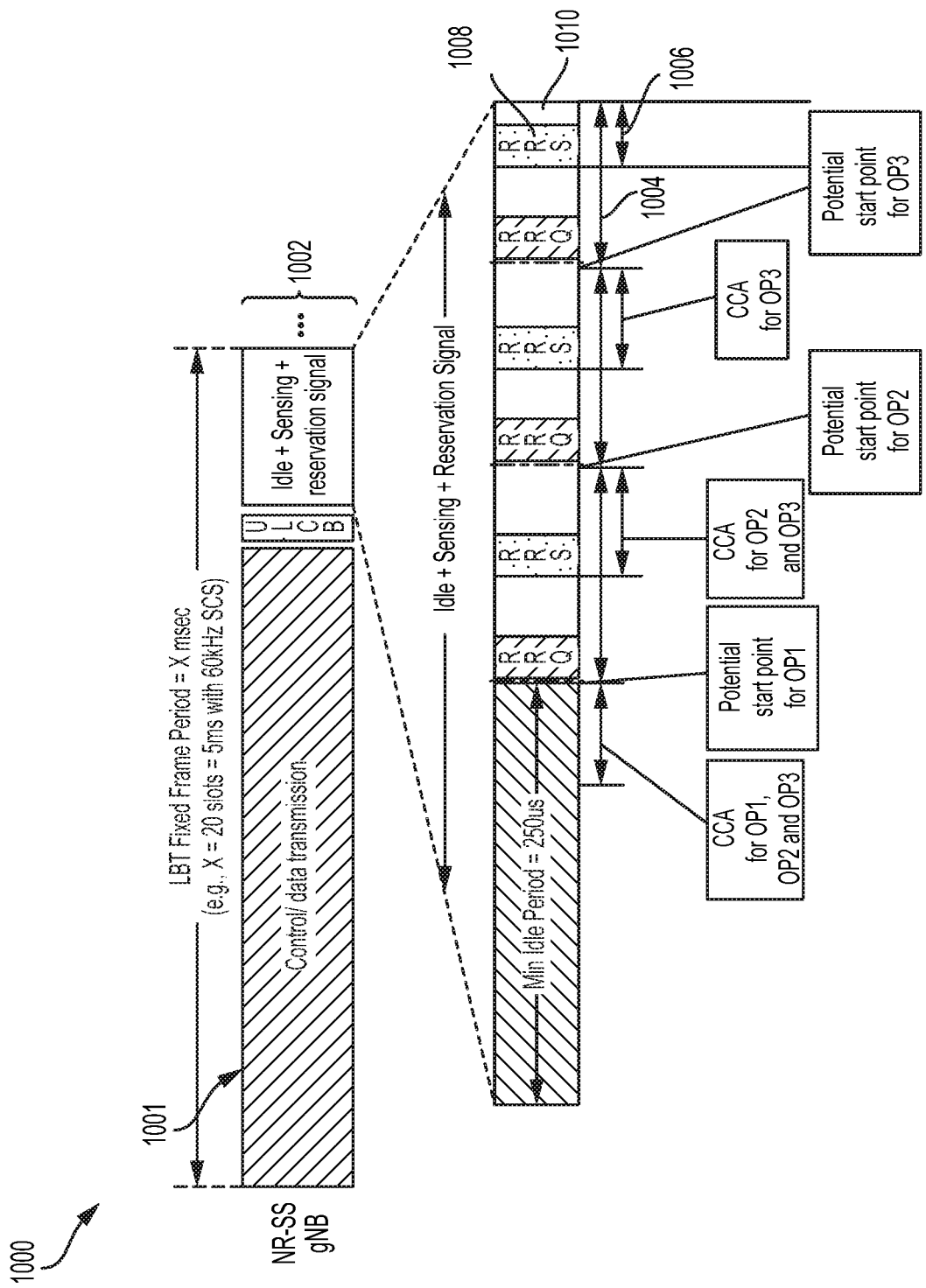
FIG. 10 illustrates another exemplary wireless communication over a shared medium using an example LBT procedure, in accordance with aspects of the present disclosure.

When all the operators are aware of the AUL resource allocation of each other, the default medium sensing slot with smaller overhead may be employed when the TXOP does not include the AUL resource. The sensing slot with larger overhead may be invoked when AUL resources are allocated One or more aspects described above describe AUL transmission, from a UE 115 associated with an operator, based on a wireless communication node associated with the operator obtaining access to a TXOP. One or more aspects of the present methods and apparatus include AUL transmission from a UE 115 associated with an operator regardless of whether a wireless communication node associated with the operator obtains access to a TXOP. For example, FIG. 10 illustrates another exemplary wireless communication 1000 over a shared medium using an example LBT procedure in accordance with aspects of the present disclosure. The exemplary communication 1000 employs a wireless communication structure 1001 that accommodates a LBT procedure. The exemplary wireless communication structure 1001 may be similar to the exemplary wireless communication structure 501 described with reference to FIG. 5 and FIG. 6. In contrast to the exemplary wireless communication structure 501, wireless communication structure 1001 may include a CCA period or slot 1004, for example, after a CCA period or slot associated a lowest priority operator in the network 100 (e.g., after CCA period or slot for OP3 in this example). During the CCA period or slot 1004, one or more wireless communication nodes associated with any of the operators OP1, OP2, OP3 of the network 100 may perform the LBT procedure. For example, during a medium sensing portion 1006 of the CCA period or slot 1004, one or more wireless communication nodes (e.g., one or more AUL UEs 115) associated with any of the operators OP1, OP2, OP3 of the network 100 may perform CCA. Based on the CCA, an AUL UE 115 may transmit an AUL transmission using time and/or frequency resources 1010 associated with the TXOP (e.g., in a transmission period of the TXOP).

In some examples, such one or more AUL UE 115 may perform sensing of one or more portions of such time and/or frequency resources, and transmit the AUL transmission based thereon. Such one or more AUL UEs 115 may have different medium sensing starting points (e.g., to reduce and/or avoid communication collisions). In aspects, the different medium sensing starting points may be based on one or more AUL groups associated with the one or more AUL UEs 115. In aspects, different AUL groups may have different sets of AUL starting points. For example, different AUL groups may be employed for different AUL UEs associated with a same operator. In additional and/or alternative aspects, different AUL groups may be employed AUL UEs associated with different operators. Regarding the additional AUL sensing within the allowed time/frequency resource, AUL UEs may have different starting points to sense the medium within the allowed time/frequency resources to avoid the collision among AUL with downlink (DL), AUL with scheduled uplink, AUL with AUL within same operator, and AUL with AUL with different operator.

In aspects, some examples, UEs from different operators can be assigned with a different set of starting points on the allowed time/frequency resources. In some examples, different AUL groups may be defined having different starting points to avoid the collision between different AUL groups. For example, OP1 AUL UEs could start on an element of {0 us, 16 us, 25 us, 34 us}, OP2 AUL UEs could start on an element of {43 us, 52 us, . . . } on the allowed time/frequency resources. The starting point can vary from one TXOP to another to ensure the fairness across operators. Within each operator, the UEs can have further different starting point within the allowed resources based on the gNB configuration. In some examples, the AUL transmission can only start after potential DL or SUL communications. For example, this can be controlled (e.g., by a BS 105) by setting starting point of AUL to be later than DL or SUL. The UEs with later starting point can sense the earlier AUL transmission via one slot CCA sensing. In some examples, the AUL sensing within the allowed time and/or frequency resources is similar to the LBE AUL design within gNB MCOT. In aspects, the present methods and apparatus may apply to gNB MCOT to licensed operation.

In this manner, AUL transmission is not gated by a TXOP reservation. AUL transmission can occur by a UE 115 within its own TXOP (e.g., a TXOP reserved by a node associated with the same operator as the UE), as well as outside its own TXOP (e.g., a TXOP reserved by a node associated with another operator or an unreserved TXOP). In aspects, all operators may send RRQ and/or RRS in the medium sensing slot (e.g., slot or portion 1004). An AUL UE listens to RRQ and/or RRS from such operators to determine whether the medium is occupied or not. If the UE detects RRQ from its own operator, the UE knows the current TXOP is occupied by its own operator and the UE can jump in the TXOP (e.g., transmit AUL in the TXOP). If UE does not detect RRQ from its own operator and detects RRS from other operator, the UE knows the medium is occupied by another operator and will refrain from jumping in the TXOP (e.g., will not transmit AUL in the TXOP). If the UE does not detect RRQ from its own operator or RRS from other operator, the UE can jump in the TXOP (e.g., transmit AUL in the TXOP).

Figure 11:
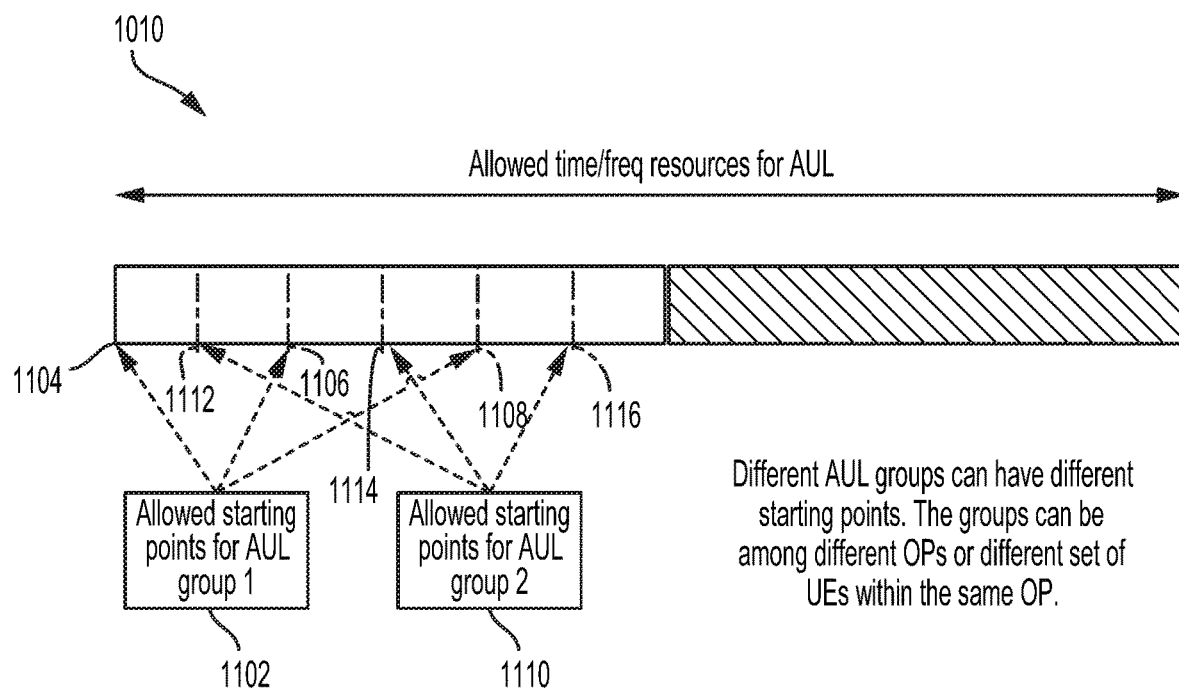
FIG. 11 illustrates exemplary sensing starting points, in accordance with aspects of the present disclosure.

FIG. 11 illustrates exemplary sensing starting points, in accordance with aspects of the present disclosure. In some examples, a first AUL group 1102 may be associated with a first set of one or more starting points. As shown, the first AUL group 1102 may be associated with a first, second, and third medium sensing starting point 1104,1106, 1108, respectively. A second AUL group 1110 may be associated with a second set of one or more starting points. As shown, the second AUL group 1110 may be associated with a first, second, and third medium sensing starting point 1112, 1114, 1116, respectively. If an AUL UE 115 determines time and/or frequency resources 1010 (e.g., allowed for AUL transmission) are not being used during medium sensing using a medium sensing starting point associated with the AUL UE 115, such UE 115 may transmit the AUL transmission using one or more remaining portions of the time and/or frequency resources 1010. Although two AUL groups each having three medium sensing starting points are shown in FIG. 11, a larger or small number of AUL groups may be employed. Additionally, or alternatively, a larger or smaller number of medium sensing starting points in one or more of such groups may be employed. Thus, AUL UEs may have different starting point to sense the medium within the allowed time/frequency resources. In some examples, different operators can have different starting points. The starting points for each operator can vary from one TXOP to another to ensure the fairness across operators. In some examples, within each operator, the UEs can have different starting points within the allowed set based on the gNB configuration.

Figure 12A:
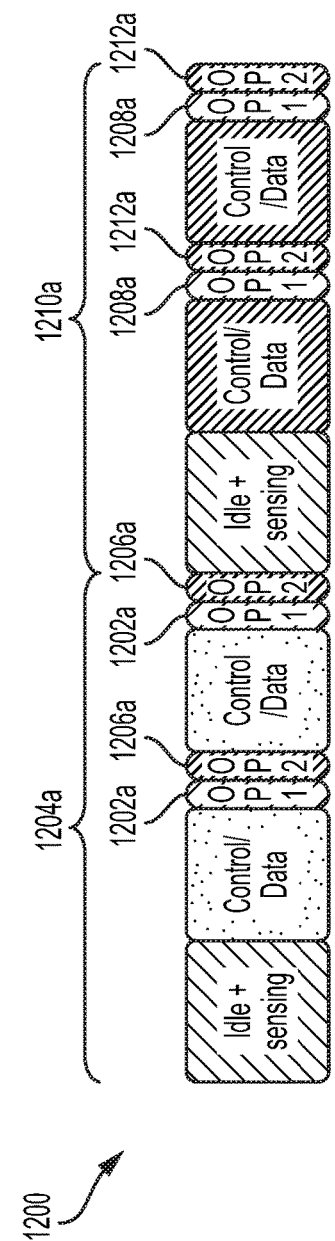
FIGS. 12A-12C illustrates exemplary dedicated AUL resources for one or more with wireless communication nodes (e.g., UEs) associated with a plurality of operators, in accordance with aspects of the present disclosure.
Figure 12B:
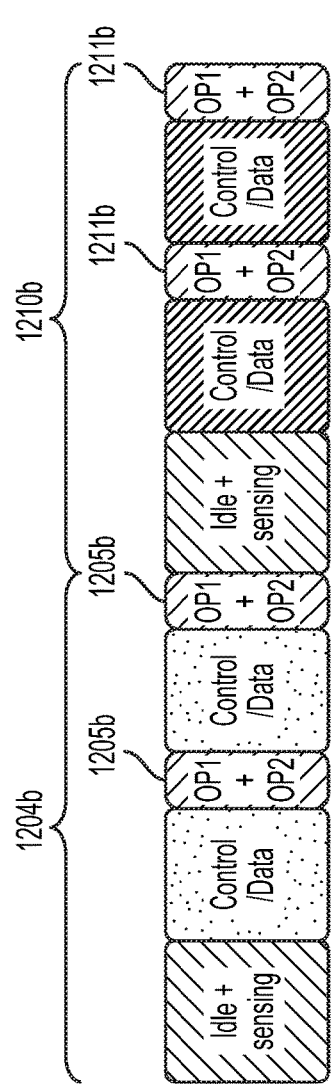
Figure 12C:
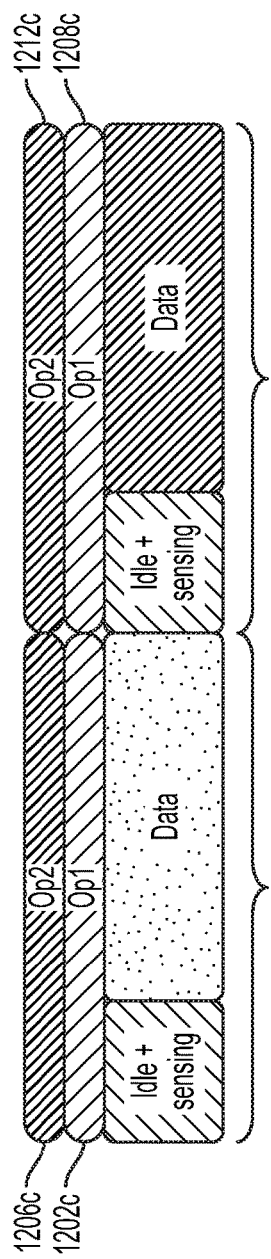

FIGS. 12A-12C illustrate exemplary dedicated AUL resources 1200 for one or more with wireless nodes (e.g., UEs) associated with a plurality of operators, in accordance with aspects of the present disclosure. For example, FIG. 12A illustrates a first set 1202a of time and/or frequency resources dedicated for a first operator OP1 associated with a first TXOP 1204a. A second set 1206a of time and/or frequency resources are dedicated for a second operator OP2 associated with the first TXOP 1204a. FIG. 12A illustrates a third set 1208a of time and/or frequency resources dedicated for the first operator OP1 associated with a second TXOP 1210a. A fourth set 1212a of time and/or frequency resources are dedicated for the second operator OP2 associated with the second TXOP 1210a. FIG. 12B illustrates a first set 1205b of time and/or frequency resources dedicated for the first operator OP1 and/or the second operator OP2 associated with a first TXOP 1204b. A second set 1211b of time and/or frequency resources are dedicated for the first operator OP1 and/or the second operator OP2 associated with a second TXOP 1210b, FIG. 9C illustrates a first set 1202c of time and/or frequency resources dedicated for a first operator OP1 associated with a first TXOP 1204c. A second set 1206c of time and/or frequency resources are dedicated for a second operator OP2 associated with the first TXOP 1204c. FIG. 9C illustrates a third set 1208c of time and/or frequency resources dedicated for the first operator OP1 associated with a second TXOP 1210c. A fourth set 1212c of time and/or frequency resources are dedicated for the second operator OP2 associated with the second TXOP 1210c.

As shown, the dedicated time and/or frequency resources could be per operator or among a plurality (e.g., all) operators. In some examples, a UE 115 could use the dedicated resources to send AUL data or a scheduling request (SR). For example, an AUL UE 115 may send an SR or small payload to a BS 105 which can therefore try to contend for the medium in the subsequent TXOPs.

In some cases, one or more AUL UE 115 may perform sensing of one or more portions of such time and/or frequency resources (e.g., the dedicated time and/or frequency resources 1202, 1205, 1206, 1208, 1211, 1212), and transmit the AUL transmission based thereon, for example as described with reference to FIG. 10 and FIG. 11.

Figure 13:
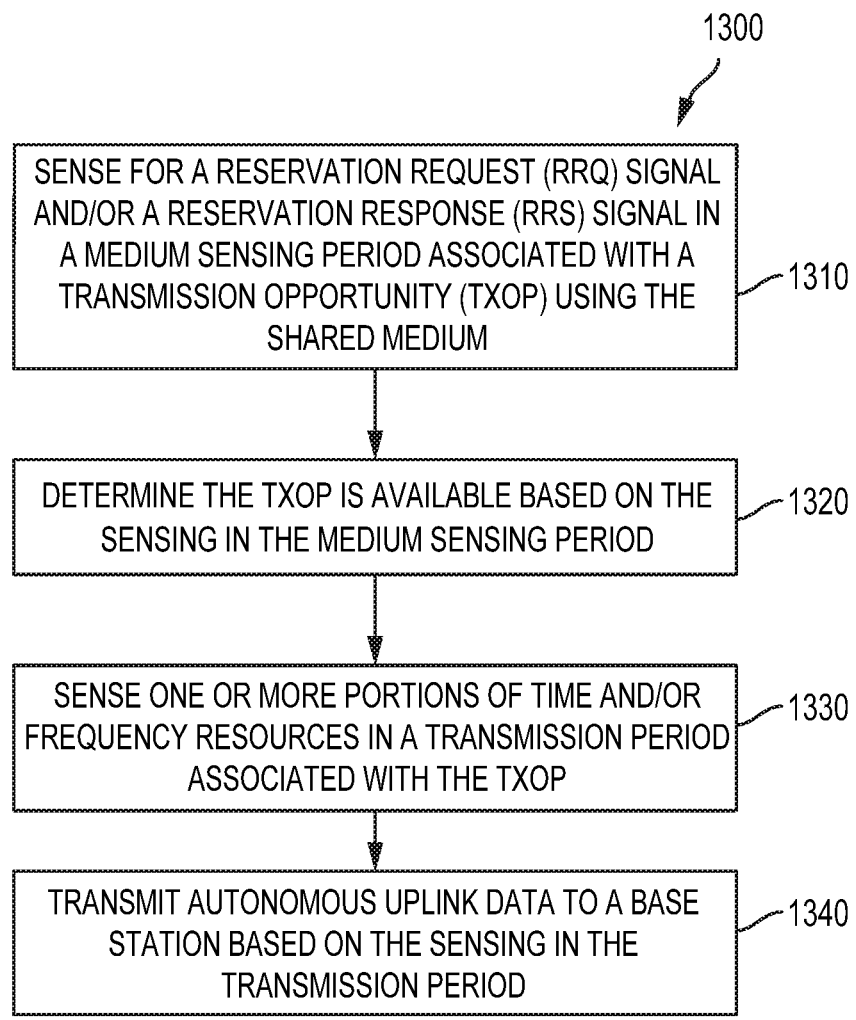
FIG. 13 illustrates another example of a process flow of wireless communication over a shared medium by a UE, in accordance with aspects of the present disclosure.

FIG. 13 illustrates another example of a process flow for a method 1300 of wireless communication over a shared medium, in accordance with aspects of the present disclosure. The method 1300 may be performed, for example, by a UE (e.g., such as a UE 115 in the network 100 shown in FIG. 1). Steps of the method 1300 can be executed by a computing device (e.g., a processor, processing circuit, and/or other suitable component) of a UE 115. The method 1300 may facilitate AUL transmission using shared RF spectrum. As illustrated, the method 1300 of wireless communication includes a number of enumerated steps. In some examples, the method 1300 may include additional steps before, after, and/or in between the enumerated steps. In some examples, one or more of the enumerated steps may be omitted or performed in a different order.

At step 1310, the method 1300 includes sensing for a RRQ signal and/or a RRS signal in a medium sensing period associated with a TXOP using the shared medium. In some examples, the RRQ signal and/or RRS signal in the medium sensing period is from another UE or BS associated with the first operator, or from another UE or BS associated with a second operator.

At step 1320, the method 1300 includes determining the TXOP is available based on the sensing in the medium sensing period. In some examples, the method 1300 further comprises detecting a RRQ signal from another UE or BS associated the first operator in the medium sensing period. In this case, the determination the TXOP is available based on the sensing in the medium sensing period includes determining the TXOP is available based on detecting the RRQ from the another UE or BS associated with the first operator in the medium sensing period. In some examples, the method 1300 further comprises determining the RRQ signal and/or a RRS signal is not detected in the medium sensing period. In this case, the determination the TXOP is available based on the sensing in the medium sensing period includes determining the TXOP is available based on the determination the RRQ signal and/or RRS signal is not detected in the medium sensing period.

At step 1330, the method 1300 includes sensing one or more portions of time and/or frequency resources in a transmission period associated with the TXOP.

In some examples, the sensing one or more portions of time and/or frequency resources in a transmission period associated with the TXOP is based on a first set of one or more sensing starting points. For example, the first set of one or more sensing starting points may be associated with the first operator. In some examples, a second set of one or more starting points are associated with a second operator using the shared spectrum. For example, the first set may be associated with a first group of one or more UEs, and the second set may be associated with a second group of one or more UEs. In some examples, a sensing starting point in the first set precedes the one or more sensing starting points in the second set for the TXOP, and a sensing starting point in the second set precedes the one or more sensing starting points in the first set for the another TXOP. The first set and/or second set may be different in another TXOP.

In some examples, where the sensing one or more portions of time and/or frequency resources in a transmission period associated with the TXOP is based on a first set of one or more sensing starting points, the first set of one or more sensing starting points is configured to, when transmitting AUL data, reduce collision with a downlink transmission associated with the first operator, a scheduled uplink transmission associated with the first operator, and/or another AUL transmission associated with a second operator. Transmitting AUL data may be subsequent a downlink transmission and/or a scheduled uplink transmission.

In some examples, where the first set of one or more sensing starting points are associated with the first operator, the sensing one or more portions of time and/or frequency resources (e.g., in a transmission period) associated with the TXOP is further based on a first sensing starting point associated with the UE in the first set. In some examples, a second sensing starting point in the first set corresponds to another UE associated with the first operator. The first sensing starting point may be associated with the UE in the first set is based on a BS configuration.

In some examples, where the sensing one or more portions of time and/or frequency resources in a transmission period associated with the TXOP is based on a first set of one or more sensing starting points and the first set of one or more sensing starting points are associated with the first operator, a second set of one or more sensing starting points are associated with the first operator. The first set of one or more sensing starting points may be related to a first set of one or more UEs associated with the first operator, and the second set of one or more sensing starting points may be related to a second set of one or more UEs associated with the first operator. In some examples, the UE is an AUL UE.

At step 1340, the method 1300 includes transmitting AUL data to a BS based on the sensing in the transmission period.

In this manner, AUL transmission from a UE 115 associated with an operator may be facilitated regardless of whether a wireless communication node associated with the operator has obtained access to a TXOP.

Figure 14:
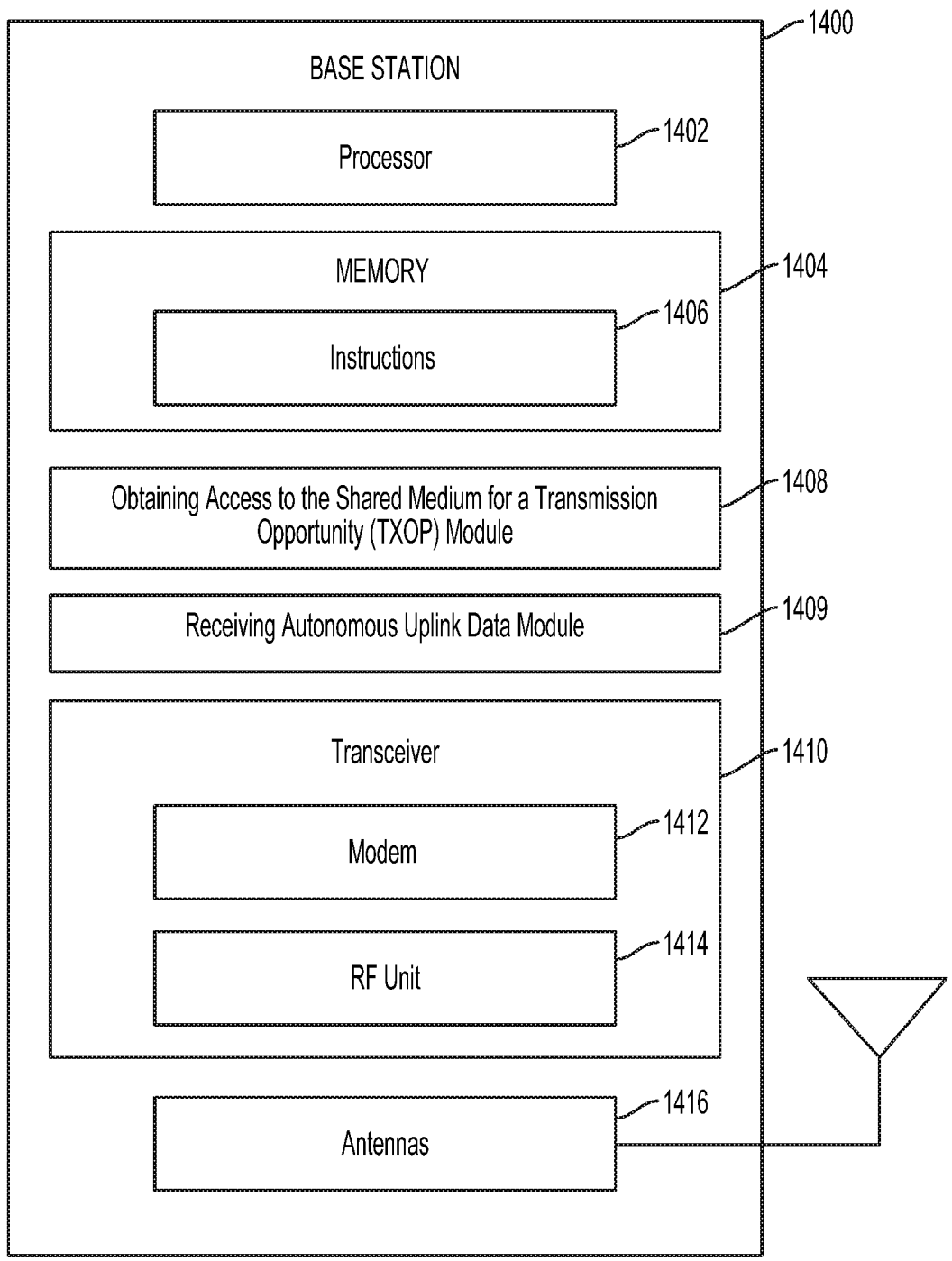
FIG. 14 is a block diagram of an exemplary BS, in accordance with aspects of the present disclosure.

FIG. 14 is a block diagram of an example BS 1400, in accordance with aspects of the present disclosure. The BS 1400 may be a BS 105, configured to operate as discussed above, for example. As shown, the BS 1400 may include a processor 1402, a memory 1404, an obtaining access to the shared medium for a TXOP module 1408, a receiving AUL data module 1409, a transceiver 1410 including a modem subsystem 1412 and a RF unit 1414, and one or more antennas 1416. These elements may be in direct or indirect communication with each other, for example via one or more buses.

The processor 1402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some examples, the memory 1404 includes a non-transitory computer-readable medium. The memory 1404 may store instructions 1406. The instructions 1406 may include instructions that, when executed by the processor 1402, cause the processor 1402 to perform the operations, such as methods 700 described herein in connection with aspects of the present disclosure. Instructions 1406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The obtaining access to the shared medium for a TXOP module 1408 and/or the receiving AUL data module 1409 may be used for various aspects of the present disclosure. For example, the obtaining access to the shared medium for a TXOP module 1408 may obtain access to the shared medium for a TXOP, by a first BS associated with a first operator, based on AUL resources in the TXOP allocated to at least one UE served by the first BS and/or an indication from the at least one UE of AUL data. The receiving a combined signal using a spectrum shared module 1409 may receive the AUL data from the at least one UE.

As shown, the transceiver 1410 may include the modem subsystem 1412 and the RF unit 1414. The transceiver 1410 can be configured to communicate bi-directionally with other devices, such as the BSs 105 and/or UEs 115. The modem subsystem 1412 may be configured to modulate and/or encode the data from the memory 1404, the obtaining access to the shared medium for a TXOP module 1408 and/or the receiving AUL data module 1409 according to a modulation and coding scheme (MCS), such as a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data from the modem subsystem 1412 (on outbound transmissions) or of transmissions originating from another source such as a UE 115 or a BS 105. The RF unit 1414 may be further configured to perform analog beamforming in conjunction with the digital beamforming. Although shown as integrated together in transceiver 1410, the modem subsystem 1412 and the RF unit 1414 may be separate devices that are coupled together at the BS 1400 to enable the BS 1400 to communicate with other devices.

The RF unit 1414 may provide the modulated and/or processed data, such as data packets (or, more generally, data messages that may contain one or more data packets and other information), to the antennas 1416 for transmission to one or more other devices. This may include, for example, transmission of signaling to obtain access to the shared medium for the TXOP by the BS 1400, according to aspects of the present disclosure. The antennas 1416 may further receive data messages transmitted from other devices. This may include, for example, receiving an AUL transmission by the BS 1400, according to aspects of the present disclosure. The antennas 1416 may provide the received data messages for processing and/or demodulation at the transceiver 1410. The antennas 1416 may include multiple antennas of similar or different designs in order to sustain multiple transmission links. The RF unit 1414 may configure the antennas 1416.

FIG. 14 is provided as an example. Other examples are possible and may differ from what was described in connection with FIG. 14.

Figure 15:
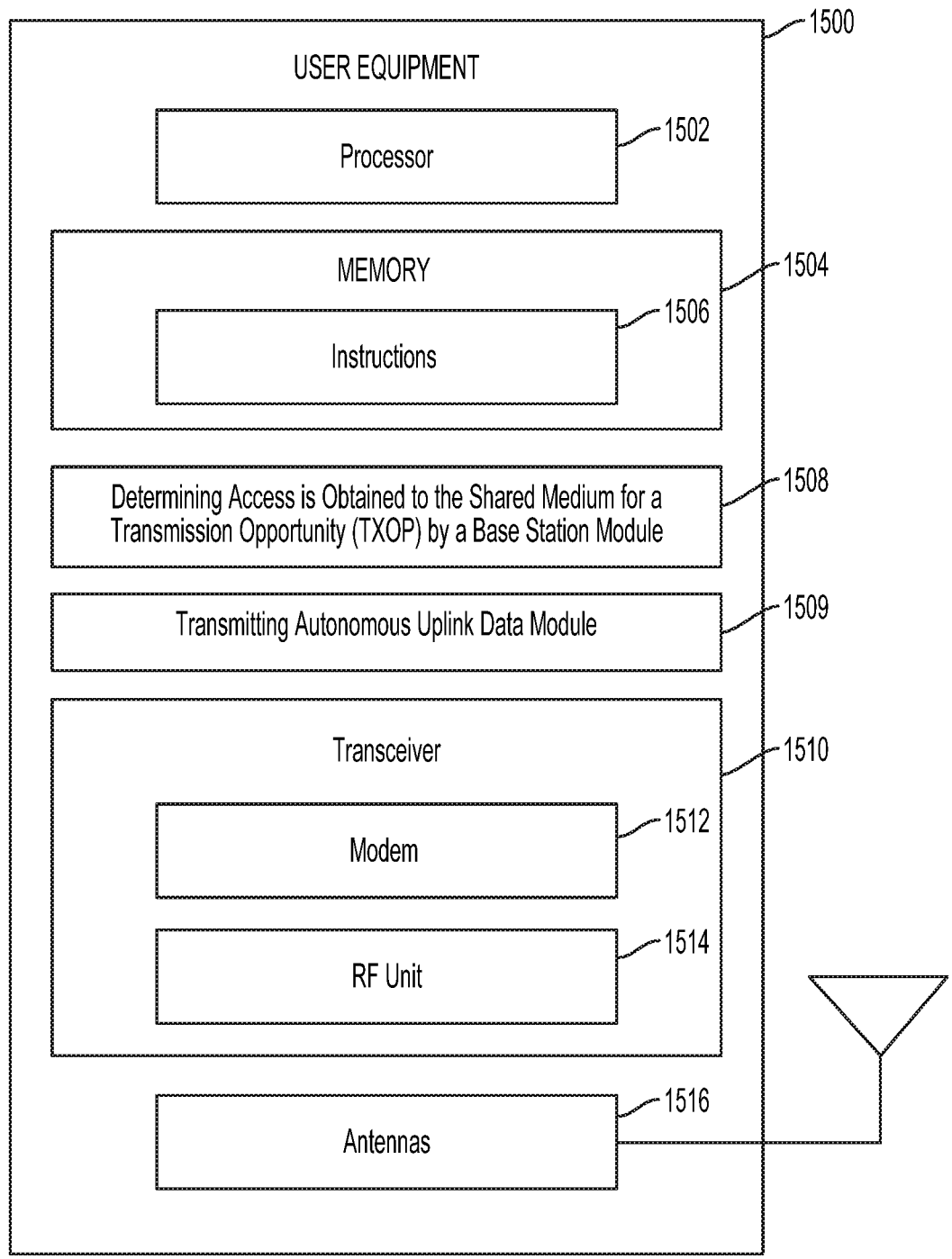
FIG. 15 is a block diagram of an exemplary UE, in accordance with aspects of the present disclosure.

FIG. 15 is a block diagram of an exemplary UE 1500, in accordance with aspects of the present disclosure. In some examples, the UE 1500 may be a UE 115 configured to operate as discussed above, for example. As shown, the UE 1500 may include a processor 1502, a memory 1504, a determining access is obtained to the shared medium for a TXOP by a first BS module 1508, a transmitting AUL data module 1509, a transceiver 1510 including a modem subsystem 1512 and a RF unit 1514, and one or more antennas 1516. These elements may be in direct or indirect communication with each other, for example via one or more buses.

The processor 1502 may include a CPU, a DSP, an ASIC, a controller, a FPGA device, another hardware device, a firmware device, or any combination thereof configured to perform the operations described herein. The processor 1502 may also be implemented as a combination of computing devices, such as a combination of a DSP and a microprocessor, a plurality of microprocessors, one or more microprocessors in conjunction with a DSP core, or any other such configuration.

The memory 1504 may include a cache memory (e.g., a cache memory of the processor 1502), RAM, MRAM, ROM, PROM, EPROM, EEPROM, flash memory, solid state memory device, hard disk drives, other forms of volatile and non-volatile memory, or a combination of different types of memory. In some examples, the memory 1504 includes a non-transitory computer-readable medium. The memory 1504 may store instructions 1506. The instructions 1506 may include instructions that, when executed by the processor 1502, cause the processor 1502 to perform the operations, such as methods 800 described herein with reference to one or more of the UEs 115 and/or with reference to one or more of the BSs 105 in connection with aspects of the present disclosure. Instructions 1506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The determining access is obtained to the shared medium for a TXOP by a first BS module 1508 and/or the transmitting AUL data module 1509 may be used for various aspects of the present disclosure. For example, the determining access is obtained to the shared medium for a TXOP by a first BS module 1508 may determine, by at least one UE served by a first BS associated with a first operator, access is obtained to the shared medium for a TXOP by the first BS based on AUL resources in the TXOP allocated to at least one UE served by the first BS and/or an indication from the at least one UE of AUL data. The determining access is obtained to the shared medium for a TXOP by a first BS module 1508 may transmit an indication from the at least one UE 115 of AUL data in the modified medium reservation slot to the first BS 105. The transmitting AUL data module 1509 may transmit the AUL data from the at least one UE to the first BS.

As shown, the transceiver 1510 may include the modem subsystem 1512 and the RF unit 1514. The transceiver 1510 can be configured to communicate bi-directionally with other devices, such as the BSs 105 and/or UEs 115. The modem subsystem 1512 may be configured to modulate and/or encode the data from the memory 1504, the determining access is obtained to the shared medium for a TXOP by a first BS module 1508 and/or the transmitting AUL data module 1509 according to a MCS, such as LDPC coding scheme, a turbo coding scheme, a convolutional coding scheme, a digital beamforming scheme, etc. The RF unit 1514 may be configured to process (e.g., perform analog to digital conversion or digital to analog conversion, etc.) modulated/encoded data from the modem subsystem 1512 (on outbound transmissions) or of transmissions originating from another source such as a BS 105 or a UE 115. The RF unit 1514 may be further configured to perform analog beamforming in conjunction with the digital beamforming. Although shown as integrated together in transceiver 1510, the modem subsystem 1512 and the RF unit 1514 may be separate devices that are coupled together at the UE 1500 to enable the UE 1500 to communicate with other devices.

The RF unit 1514 may provide the modulated and/or processed data, such as data packets (or, more generally, data messages that may contain one or more data packets and other information), to the antennas 1516 for transmission to one or more other devices. This may include, for example, transmission of an AUL transmission by the UE 1500, according to aspects of the present disclosure. The antennas 1516 may further receive signals and/or data messages transmitted from other devices. This may include, for example, receiving RRQ signals, RRS signals, and/or allocation of AUL resources, by the UE 1500 according to aspects of the present disclosure. The antennas 1516 may provide the received data messages for processing and/or demodulation at the transceiver 1510. The antennas 1516 may include multiple antennas of similar or different designs in order to sustain multiple transmission links. The RF unit 1514 may configure the antennas 1516.

FIG. 15 is provided as an example. Other examples are possible and may differ from what was described in connection with FIG. 15.

Figure 16:
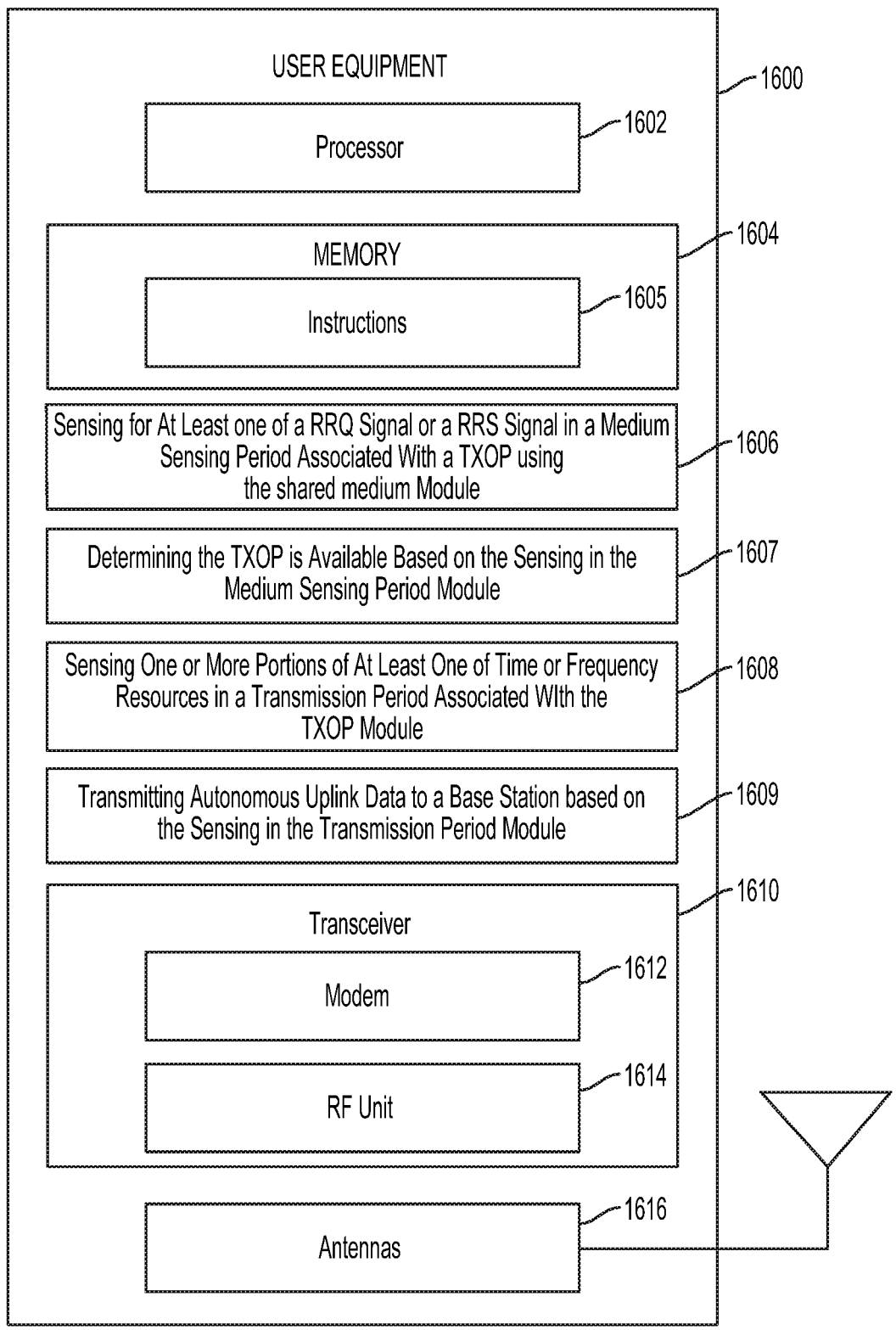
FIG. 16 is another block diagram of an exemplary UE, in accordance with aspects of the present disclosure.

FIG. 16 is another block diagram of an exemplary UE 1600, in accordance with aspects of the present disclosure. In some examples, the UE 1600 may be a UE 115, as discussed above, for example. As shown the UE 1600 may include a processor 1602, a memory 1604, a sensing for at least one of a RRQ signal or a RRS signal in a medium sensing period associated with a TXOP using the shared medium module 1606, a determining the TXOP is available based on the sensing in the medium sensing period module 1607, a sensing one or more portions of time and/or frequency resources in a transmission period associated with the TXOP module 1608, a transmitting AUL data to a BS based on the sensing in the transmission period module 1609, a transceiver 1610 including a modem subsystem 1612 and a RF unit 1614, and one or more antennas 1616. These elements may be in direct or indirect communication with each other, for example via one or more buses.

The processor 1602 may include a CPU, a DSP, an ASIC, a controller, a FPGA device, another hardware device, a firmware device, or any combination thereof configured to perform the operations described herein. The processor 1602 may also be implemented as a combination of computing devices, such as a combination of a DSP and a microprocessor, a plurality of microprocessors, one or more microprocessors in conjunction with a DSP core, or any other such configuration.

The memory 1604 may include a cache memory (e.g., a cache memory of the processor 1602), RAM), MRAM, ROM, PROM, EPROM, EEPROM, flash memory, solid state memory device, hard disk drives, other forms of volatile and non-volatile memory, or a combination of different types of memory. In some examples, the memory 1604 includes a non-transitory computer-readable medium. The memory 1604 may store instructions 1605. The instructions 1605 may include instructions that, when executed by the processor 1602, cause the processor 1602 to perform the operations, such as methods 1300 described herein with reference to one or more of the UEs 115 and/or with reference to one or more of the BSs 105 in connection with aspects of the present disclosure. Instructions 1605 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sensing for at least one of a RRQ signal or a RRS signal in a medium sensing period associated with a TXOP using the shared medium module 1606, the determining the TXOP is available based on the sensing in the medium sensing period module 1607, the sensing one or more portions of time and/or frequency resources in a transmission period associated with the TXOP module 1608, and/or the transmitting AUL data to a BS based on the sensing in the transmission period module 1609 may be used for various aspects of the present disclosure. For example, the sensing for a RRQ signal and/or a RRS signal in a medium sensing period associated with a TXOP using the shared medium module 1606 may sense for a RRQ signal and/or a RRS signal in a medium sensing period associated with a TXOP using the shared medium. The determining the TXOP is available based on the sensing in the medium sensing period module 1607 may determine the TXOP is available based on the sensing in the medium sensing period. The sensing one or more portions of time and/or frequency resources in a transmission period associated with the TXOP module 1608 may sense one or more portions of time and/or frequency resources in a transmission period associated with the TXOP. The transmitting AUL data to a BS based on the sensing in the transmission period module 1609 may transmit AUL data to a BS based on the sensing in the transmission period.

As shown, the transceiver 1610 may include the modem subsystem 1612 and the RF unit 1614. The transceiver 1610 can be configured to communicate bi-directionally with other devices, such as the BSs 105 and/or UEs 115. The modem subsystem 1612 may be configured to modulate and/or encode the data from the memory 1604, the sensing for at least one of a RRQ signal or a RRS signal in a medium sensing period associated with a TXOP using the shared medium module 1606, the determining the TXOP is available based on the sensing in the medium sensing period module 1607, the sensing one or more portions of time and/or frequency resources in a transmission period associated with the TXOP module 1608, and/or the transmitting AUL data to a BS based on the sensing in the transmission period module 1609 according to a MCS, such as a LDPC coding scheme, a turbo coding scheme, a convolutional coding scheme, a digital beamforming scheme, etc. The RF unit 1614 may be configured to process (e.g., perform analog to digital conversion or digital to analog conversion, etc.) modulated/encoded data from the modem subsystem 1612 (on outbound transmissions) or of transmissions originating from another source such as a BS 105 or a UE 115. The RF unit 1614 may be further configured to perform analog beamforming in conjunction with the digital beamforming. Although shown as integrated together in transceiver 1610, the modem subsystem 1612 and the RF unit 1614 may be separate devices that are coupled together at the UE 1600 to enable the UE 1600 to communicate with other devices.

The RF unit 1614 may provide the modulated and/or processed data, such as data packets (or, more generally, data messages that may contain one or more data packets and other information), to the antennas 1616 for transmission to one or more other devices. This may include, for example, transmission of RRQ signals, RRS signals, and/or an AUL transmission by the UE 1600, according to aspects of the present disclosure. The antennas 1616 may further receive signals and/or data messages transmitted from other devices. This may include, for example, receiving RRQ signals, RRS signals, and/or allocation of AUL resources, by the UE 1600 according to aspects of the present disclosure. The antennas 1616 may provide the received data messages for processing and/or demodulation at the transceiver 1610. The antennas 1616 may include multiple antennas of similar or different designs in order to sustain multiple transmission links. The RF unit 1614 may configure the antennas 1616.

FIG. 16 is provided as an example. Other examples are possible and may differ from what was described in connection with FIG. 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In this manner, in aspects, by employing FBE techniques, synchronized medium sharing can be achieved for better channel access and reduced medium collision and allowing for better reuse and joint transmission among the nodes with the same operator and/or different operators. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method of wireless communication over a shared medium, comprising:
receiving, by a user equipment (UE) served by a first base station (BS) associated with a first operator, an allocation of resources for autonomous uplink (AUL) transmission in a transmission opportunity (TXOP);
determining, by the UE, whether access to the shared medium for the TXOP is obtained by the first BS based on at least one of: the allocation of resources for AUL transmission in the TXOP or an indication from the UE to the first BS that the UE has AUL data to transmit in the TXOP; and
transmitting, by the UE, the AUL data to the first BS if the UE determines that access is obtained to the shared medium for the TXOP and refraining from transmitting the AUL if the UE determines that access is not obtained to the shared medium for the TXOP.

2. The method of claim 1, wherein determining whether access is obtained to the shared medium for the TXOP includes assuming the first BS contends with at least a second BS associated with at least a second operator for access to the shared medium for the TXOP based on the at least one of: receiving the allocation of resources for AUL transmission in the TXOP or sending the indication that the UE has AUL data to transmit in the TXOP.

3. The method of claim 1, further comprising:
determining the UE has AUL data to transmit in the TXOP; and
transmitting the indication from the UE in a modified medium reservation slot to the first BS based on the determination that the UE has AUL data to transmit in the TXOP.

4. The method of claim 3, further comprising employing a default medium reservation slot when first BS and second BS have not allocated AUL resources for an associated TXOP.

5. The method of claim 1, wherein the indication from the UE includes a reservation request (RRQ) signal.

6. The method of claim 5, wherein transmitting the RRQ signal from the UE includes transmitting the RRQ signal from the UE without detecting a RRQ signal from the first BS.

7. The method of claim 1, further comprising:
determining a reservation response (RRS) signal from another UE or another BS associated with another operator is not detected by the UE.

8. The method of claim 1, wherein:
the first BS comprises a frame based equipment (FBE);
the TXOP is in a listen-before-talk (LBT) fixed frame period; and
the access to the shared medium is obtained during an idle period in the LBT fixed frame period, wherein the idle period includes alternating periods for clear channel assessment (CCA), sending of reservation signals, or both, for different operators.

9. The method of claim 1, further comprising:
performing channel sensing based on the determination that access is obtained to the shared medium by the first BS, wherein the transmitting is further based on the channel sensing.

10. The method of claim 9, wherein a sensing time for the UE is different for different UEs, different groups of UEs, UEs associated with different operators, for different TXOPs, or a combination thereof.

11. An apparatus served by a first base station (BS) associated with a first operator for wireless communication over a shared medium, comprising:
at least one processor configured to:
obtain an allocation of resources for autonomous uplink (AUL) transmission in a transmission opportunity (TXOP),
determine whether access to the shared medium for the TXOP is obtained by the first BS based on at least one of: the allocation of resources for AUL transmission in the TXOP or an indication from the apparatus to the first BS that the apparatus has AUL data to transmit in the TXOP; and
output the AUL data for transmission to the first BS if the apparatus determines that access is obtained to the shared medium for the TXOP and refraining from outputting the AUL data for transmission if the apparatus determines that access is not obtained to the shared medium for the TXOP; and
a memory coupled with the at least one processor.

12. The apparatus of claim 11, wherein the at least one processor is configured to determine whether access is obtained to the shared medium for the TXOP by assuming the first BS contends with at least a second BS associated with at least a second operator for access to the shared medium for the TXOP based on the at least one of: receiving the allocation of resources for AUL transmission in the TXOP or sending the indication that the apparatus has AUL data to transmit in the TXOP.

13. The apparatus of claim 11, wherein the at least one processor is further configured to:
determining the apparatus has AUL data to transmit in the TXOP; and
output for transmission the indication from the apparatus in a modified medium reservation slot to the first BS based on the determination that the apparatus has AUL data to transmit in the TXOP.

14. The apparatus of claim 13, wherein the at least one processor is further configured to employ a default medium reservation slot when first BS and second BS have not allocated AUL resources for an associated TXOP.

15. The apparatus of claim 11, wherein the indication from the apparatus includes a reservation request (RRQ) signal.

16. The apparatus of claim 15, wherein the at least one processor is configured to output for transmission the RRQ signal from the apparatus without detecting a RRQ signal from the first BS.

17. The apparatus of claim 11, wherein the at least one processor is further configured to determine a reservation response (RRS) signal from another apparatus or another BS associated with another operator is not detected by the apparatus.

18. An apparatus served by a first base station (BS) associated with a first operator for wireless communication over a shared medium, comprising:
- means for receiving an allocation of resources for autonomous uplink (AUL) transmission in a transmission opportunity (TXOP);
- means for determining whether access to the shared medium for the TXOP is obtained by the first BS based on at least one of: the allocation of resources for AUL transmission in the TXOP or an indication from the apparatus to the first BS that the apparatus has AUL data to transmit in the TXOP; and
- means for transmitting the AUL data to the first BS if the apparatus determines that access is obtained to the shared medium for the TXOP and refraining from transmitting the AUL data if the apparatus determines that access is not obtained to the shared medium for the TXOP.

19. The apparatus of claim 18, wherein means for determining whether access is obtained to the shared medium for the TXOP includes assuming the first BS contends with at least a second BS associated with at least a second operator for access to the shared medium for the TXOP based on the at least one of: receiving the allocation of resources for AUL transmission in the TXOP or sending the indication that the apparatus has AUL data to transmit in the TXOP.

20. The apparatus of claim 18, further comprising:
- means for determining the apparatus has AUL data to transmit in the TXOP; and
- means for transmitting the indication from the apparatus in a modified medium reservation slot to the first BS based on the determination that the apparatus has AUL data to transmit in the TXOP.

21. The apparatus of claim 20, further comprising means for employing a default medium reservation slot when first BS and second BS have not allocated AUL resources for an associated TXOP.

22. The apparatus of claim 18, wherein the indication from the apparatus includes a reservation request (RRQ) signal.

23. The apparatus of claim 22, wherein means for transmitting the RRQ signal from the apparatus includes means for transmitting the RRQ signal from the apparatus without detecting a RRQ signal from the first BS.

24. The apparatus of claim 18, further comprising means for determining a reservation response (RRS) signal from another apparatus or another BS associated with another operator is not detected by the apparatus.

25. A non-transitory computer readable medium having computer executable code stored thereon for wireless communication over a shared medium, comprising:
- code for receiving, by a user equipment (UE) served by a first base station (BS) associated with a first operator, an allocation of resources for autonomous uplink (AUL) transmission in a transmission opportunity (TXOP);
- code for determining, by the UE, whether access to the shared medium for the TXOP is obtained by the first BS based on at least one of: the allocation of resources for AUL transmission in the TXOP or an indication from the UE to the first BS that the UE has AUL data to transmit in the TXOP; and
- code for transmitting the AUL data to the first BS if the UE determines that access is obtained to the shared medium for the TXOP and refraining from transmitting the AUL data if the UE determines that access is not obtained to the shared medium for the TXOP.

26. The non-transitory computer readable medium of claim 25, wherein code for determining whether access is obtained to the shared medium for the TXOP includes code for assuming the first BS contends with at least a second BS associated with at least a second operator for access to the shared medium for the TXOP based on the at least one of: receiving the allocation of resources for AUL transmission in the TXOP or sending the indication that the UE has AUL data to transmit in the TXOP.

27. The non-transitory computer readable medium of claim 25, further comprising:
- code for determining the UE has AUL data to transmit in the TXOP; and
- code for transmitting the indication from the UE in a modified medium reservation slot to the first BS based on the determination that the UE has AUL data to transmit in the TXOP.

28. The non-transitory computer readable medium of claim 27, further comprising code for employing a default medium reservation slot when first BS and second BS have not allocated AUL resources for an associated TXOP.

29. The non-transitory computer readable medium of claim 25, wherein the indication from the at least one UE includes a reservation request (RRQ) signal.

* * * * *